United States Patent
Maeda

(10) Patent No.: US 6,625,316 B1
(45) Date of Patent: Sep. 23, 2003

(54) IMAGE PROCESSING APPARATUS AND METHOD, AND IMAGE PROCESSING SYSTEM

(75) Inventor: Mitsuru Maeda, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/323,254

(22) Filed: Jun. 1, 1999

(30) Foreign Application Priority Data

Jun. 1, 1998 (JP) .......................................... 10-151766
Jun. 1, 1998 (JP) .......................................... 10-167730

(51) Int. Cl.[7] ............................ G06K 9/46; G06K 9/48; G06K 9/36; H04N 9/74
(52) U.S. Cl. ...................... 382/203; 382/236; 382/248; 382/199; 348/586
(58) Field of Search ................................ 382/190, 195, 382/203, 224, 232, 199, 236, 248; 348/584, 586, 587, 588, 589, 155, 14.01; 358/1.2

(56) References Cited

U.S. PATENT DOCUMENTS

| | | | | |
|---|---|---|---|---|
| 5,099,324 A | * | 3/1992 | Abe ........................... | 348/155 |
| 5,353,062 A | | 10/1994 | Maeda .................. | 375/240.14 |
| 5,592,567 A | * | 1/1997 | Kilger ........................ | 382/199 |
| 5,737,031 A | * | 4/1998 | Tzidon et al. .............. | 348/587 |
| 6,313,863 B1 | * | 11/2001 | Chida ...................... | 348/14.01 |
| 2002/0015161 A1 | * | 2/2002 | Haneda et al. ............... | 358/1.2 |

OTHER PUBLICATIONS

Han et al, Adaptive Coding of Moving Objects for Very Low Bit Rates, Jan. 1998, IEEE Paper ISBN: 0733–8716, vol. 16, No. 1, pp. 56–70.*

Kollias et al, Improving the Performance of MPEG Compatible Encoders Using On Line Retrainable Neural Networks, 1997, IEEE Paper ISBN: 0–8186–8183–7, pp. 424–427.*

Kim et al, Object Oriented Face Detection Using Range and Color Information, Apr. 1998, IEEE Paper ISBN: 0–8186–8344–9, pp. 76–81.*

M. Naemura, et al., "Knowledge–Based Morphological Segmentation of Sport Scenes," 1997 Image Media Processing Symposium (IMPS971–3.15), Japan, Oct. 6–8, 1997, Abstract.

* cited by examiner

Primary Examiner—Mehrdad Dastouri
(74) Attorney, Agent, or Firm—Fitzpatrick, Cella, Harper & Scinto

(57) ABSTRACT

Of an object extracted from an image, it is difficult to separately process a main object and a secondary object, such as a shade, attached to the main object. If an object extracted from an image contains a plurality of objects, these objects are difficult to process as independent objects. In this invention, an object indicating a shade is separated from an object extracted from an image to thereby classify the object into a main object and a secondary object, and suitable image processing is performed for each of the main object and the secondary object. An object extracted from an image is separated on the basis of shape information of the object. The similarity of each separated object is measured in units of frames to obtain an interframe correlation. This increases the encoding efficiency.

8 Claims, 53 Drawing Sheets

FIG. 5

| NO. | OBJECT | LINK |
|---|---|---|
| 1 | Shade | |
| 2 | Helicoptor | 1 |
| 3 | | |
| 4 | | |

F I G. 34
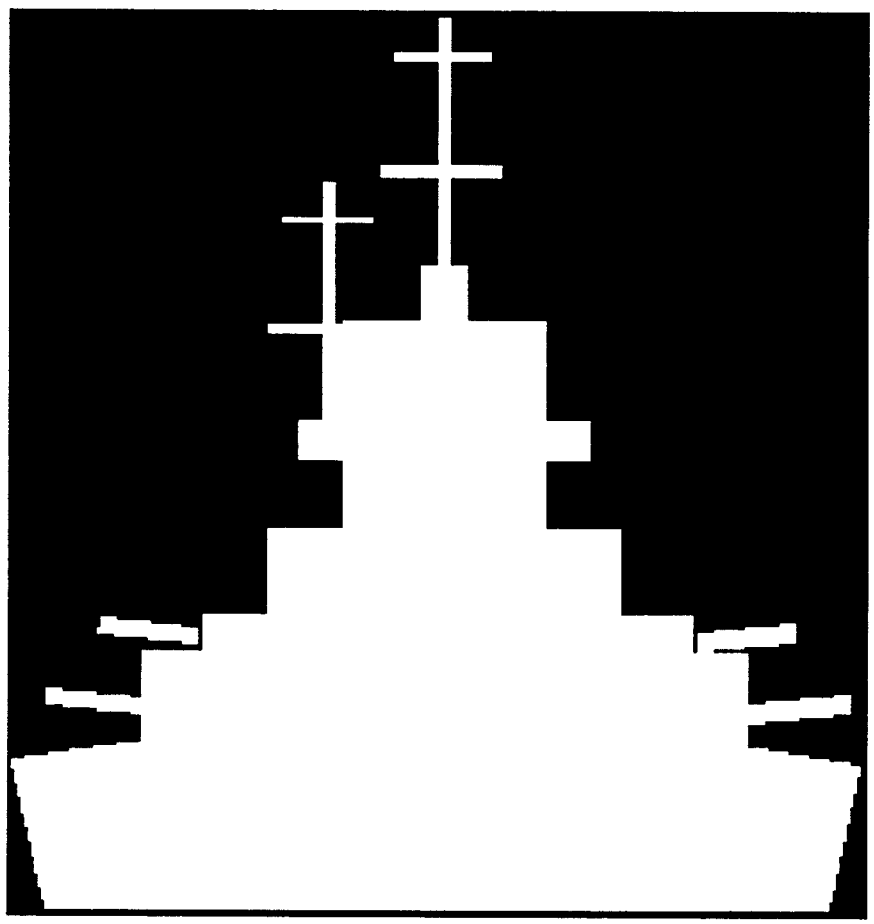

F I G. 37
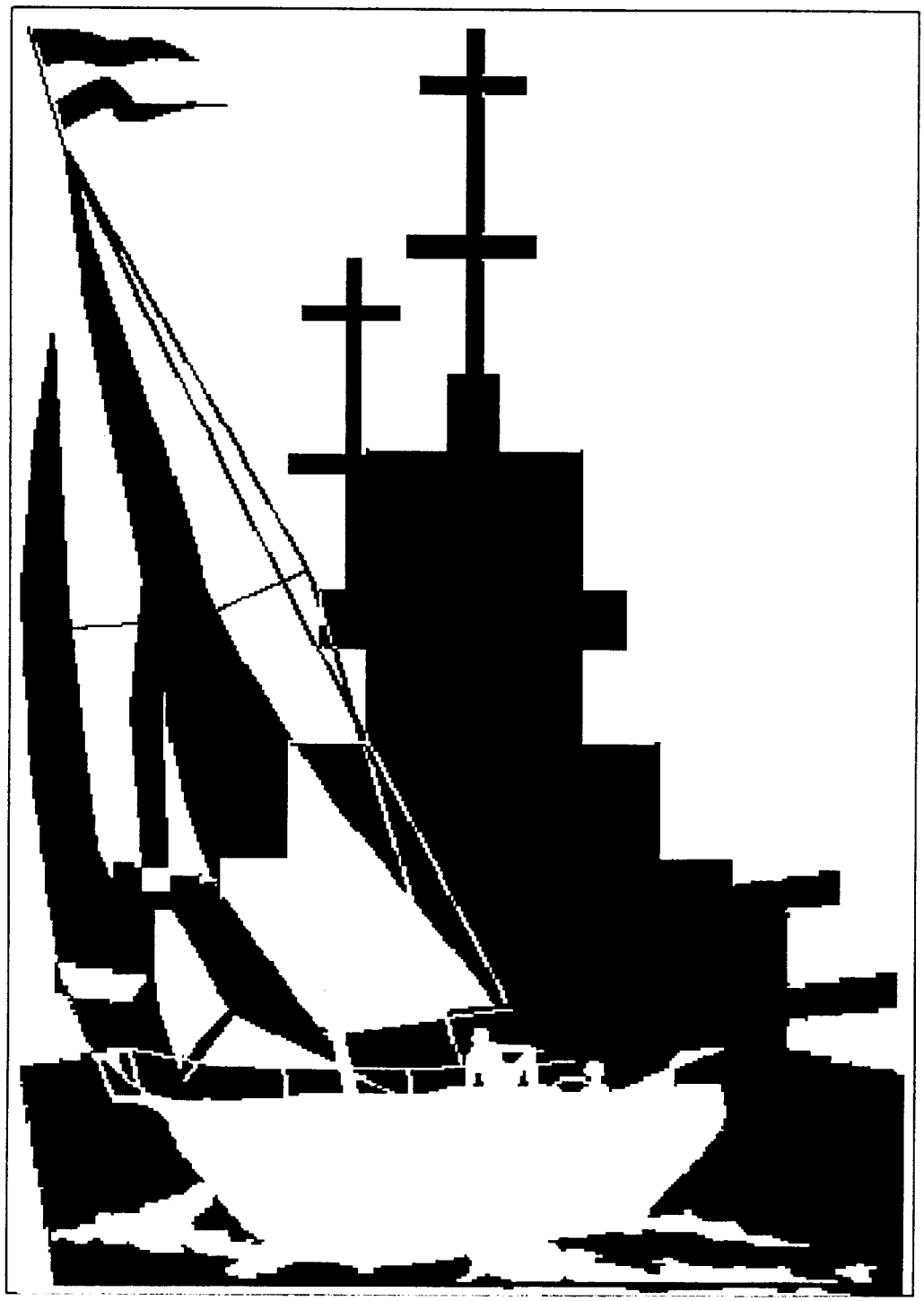

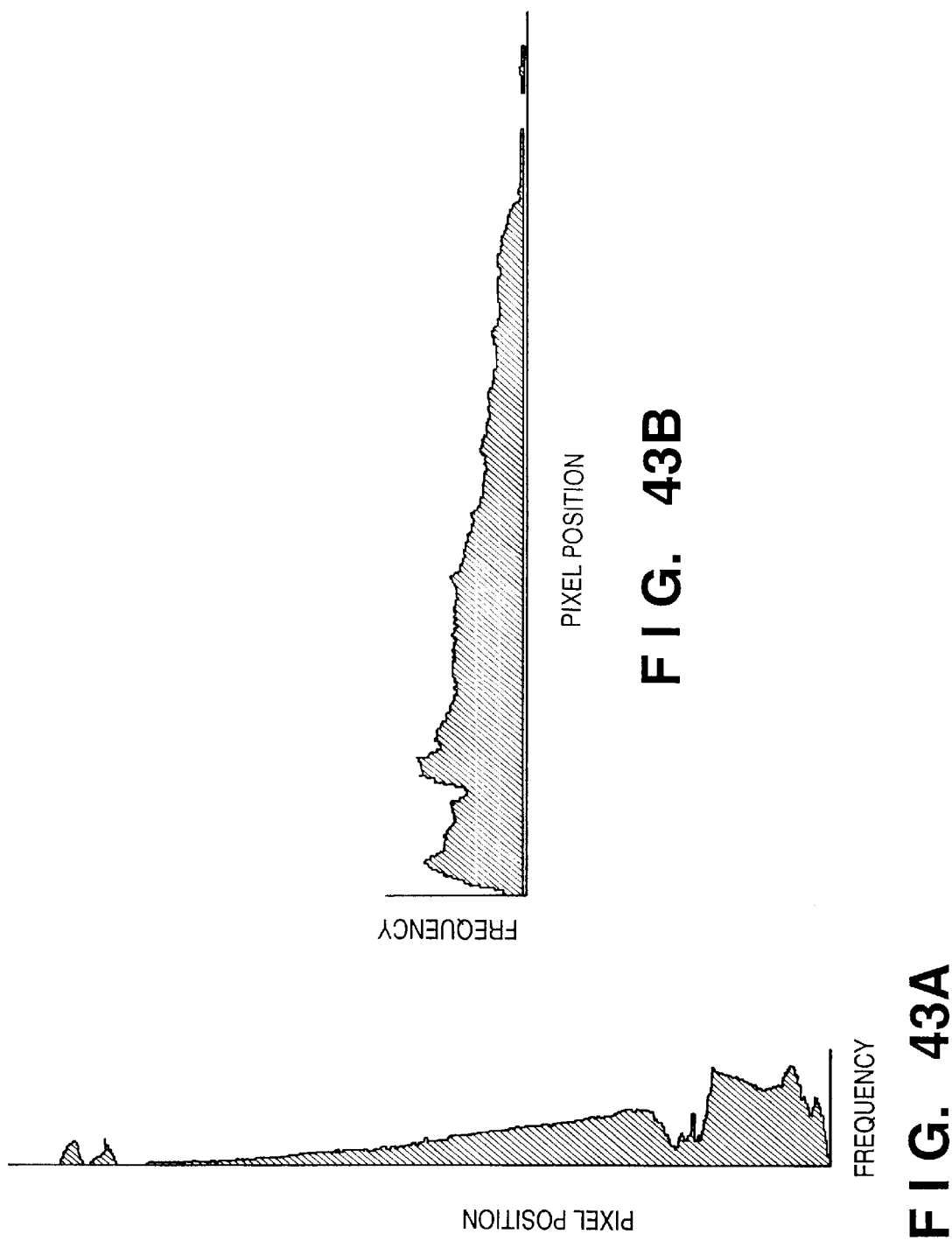

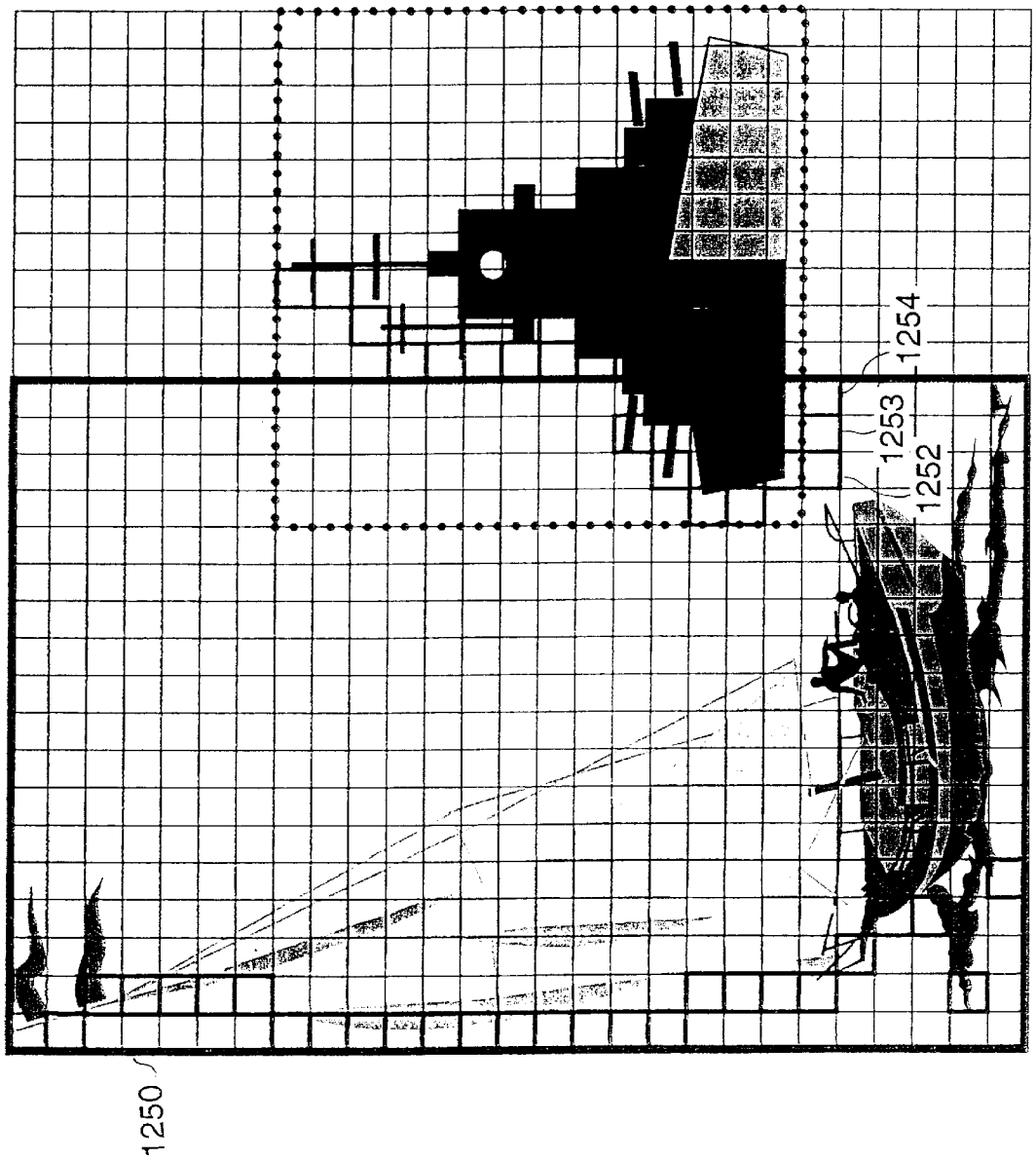

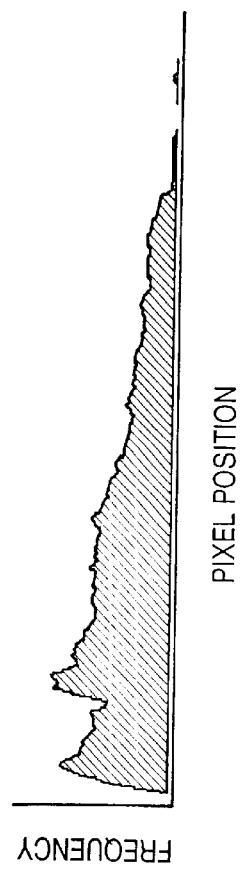
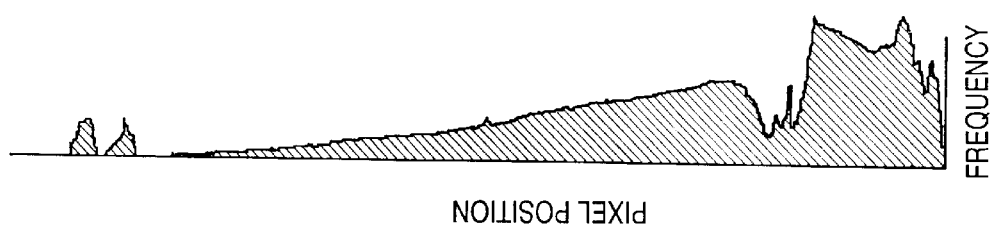
FIG. 46B
FIG. 46A

IMAGE PROCESSING APPARATUS AND METHOD, AND IMAGE PROCESSING SYSTEM

BACKGROUND OF THE INVENTION

1. Field of the Invention

The present invention relates to an image processing apparatus and method and, more particularly, to an image processing apparatus and method of extracting an object from an image and processing the extracted object.

2. Description of the Related Art

Coding systems such as MPEG-1, MPEG-2, and H.261 are known as conventional motion image coding systems. These coding systems can efficiently encode motion images by using an interframe correlation.

As a coding system having higher efficiency than those of the above conventional coding systems, standardization of a system, such as MPEG-4, has been examined which cuts out an object from an image, encodes the object separately from its background, and transmits only this object. When this coding system is used, an image region to be transmitted can be decreased, so motion images can be transmitted even by a low-bit-rate channel. Additionally, a receiving side can display suitable images by selectively displaying objects or changing the arrangement or sizes of objects. Furthermore, editing such as synthesizing an object with another background can be easily performed.

As a method of extracting an object from a motion image, an extraction technique using a chromakey used in broadcasting stations and the like is generally known. This technique is a method of photographing an object such as a person before a blue background and cutting out this person object from the image signal. Object photographing using the chromakey is usually performed in photographing studios and the like under well-ordered illuminating conditions, so no object shades are formed.

Also, the method can automatically separate an image region from a still image. To extract an object from a still image, a desired image region is cut out by manually designating the region by a user or uniting regions having similar colors.

Unfortunately, objects extractable by the chromakey are limited to relatively small ones which can be photographed only before a blue background. Extraction from motion images of natural images is one possible method of extracting relatively large objects. Known examples of the method are a method of previously inputting a background image and cutting out an object from a difference image of the background image and an input image and a method of previously acquiring color information and the like constructing a background and extracting a region having a different color from that of the color information from an input image (Picture Coding Symposium of Japan PCSJ97I-3.15).

A method of cutting out a helicopter 1051 as an object from an image 1050 as shown in FIG. 21 will be described below. That is, a difference between the image 1050 shown in FIG. 21 and a previously photographed background image 1052 shown in FIG. 22 is obtained. Processing such as noise reduction is performed for this difference to extract an object 1053 shown in FIG. 23. A new image shown in FIG. 25 can be edited by synthesizing the object 1053 and a background image 1054 shown in FIG. 24.

Unlike in object photographing for general chromakey synthesis, however, an object in a motion image of a natural image often has a shade because the object is photographed in natural light. Therefore, the shade of the helicopter appears in the sky in the image shown in FIG. 25, resulting in unnatural synthesis.

Likewise, an object 1057 shown in FIG. 27 is obtained by cutting out a cattle 1056 grazing herbage on a lawn from an image 1055 shown in FIG. 26. When this object 1057 is synthesized on an image of an urban district as shown in FIG. 28, the shade of the cattle contained in the object 1057 is also synthesized. An image of this cattle shade contains an image of the herbage on the lawn in the original image 1055. Therefore, when this object 1057 is synthesized on the asphalt background as shown in FIG. 28, a considerably unnatural image results.

To obtain an object having no shade by using the chromakey or the like and synthesize this object, a three-dimensional positional relationship between the object and the synthesized background, a light source, and the like can be set by, e.g., computer processing. This setting is effective in a limited environment such as a studio. However, no shade can be formed for an object once two-dimensionally input as a motion image, so an unnatural synthetic image having no shade is formed. FIG. 29 shows an image formed by synthesizing the cattle 1056 with no shade. As is evident from FIG. 29, this image is very unnatural. This unnaturalness of an image resulting from shadeless synthesis becomes conspicuous when the image is synthesized on a background image having large amounts of shades of other objects.

As described above, it is difficult to independently and appropriately process a main object extracted from an image and a secondary object attached to this main object.

The abovementioned MPEG-4 coding system is a method of separating a motion image into a background and a subject to be encoded, which is called an "object", and separately encoding the background and the object. Unlike in encoding performed in units of frames such as in conventional MPEG-1, MPEG-2, h.261, and h.263, a background having no (or little) motion is encoded only once, so low-bit-rate encoding is possible. Additionally, a decoding side can easily perform editing such as selection, enlargement or reduction, and rotation of an object. This allows a user to perform desired decoding.

An example of coding in the MPEG-4 coding system will be described below. Note that a method of extracting a background and an object from an image is not a standard subject of MPEG-4, so any arbitrary method can be used. For example, a method as described in "Morphological Segmentation Using Advance Knowledge Information in Sports Programs" (1997 Image Media Processing Symposium (IMPS97) I-3, 15, Oct. 8th, 1997, Naemura et al.) This is a method of previously acquiring information of, e.g., a ground where no players as objects exist, as a background and, on the basis of this background information, extracting objects (players) from a motion image.

FIG. 47 is a block diagram showing the arrangement of a conventional motion image input apparatus. Referring to FIG. 47, motion image data obtained by image sensing by a TV camera 1001 is stored in a background memory 1002. Assume that an image of a yacht and a battle ship cruising on the sea as shown in FIG. 48 is to be processed. When a background region is extracted from this image by forming a color histogram, the sky in the upper half and the sea in the lower half can be detected as shown in FIG. 49. Since this background image shown in FIG. 49 is encoded by, a background image encoder 1003.

Subsequently, an image containing the yacht and the battle ship as objects is sensed as a motion image. An object extractor 1004 extracts the objects by calculating the difference from the background image or extracting regions having different colors from that of the background image. The extracted objects are as shown in FIG. 50. An object encoder 1005 encodes these objects.

FIG. 51 is a detailed block diagram of the object encoder 1005. Shape information of an object is input from a terminal 1020 and stored in a shape memory 1022. This shape information is represented by a binary image in which pixels indicating an object are white and other pixels are black. A boundary extractor 1023 extracts pixels where black and white are switched from this image as a boundary and inputs this boundary to a motion compensator 1024. If a frame mode is an I frame, this motion compensator 1024 does not operate but the input shape information is stored to a boundary memory 1025 and arithmetically encodes at a arithmetic encoder 1026. If the frame mode is a P frame or a B frame, the motion compensator 1024 performs motion compensation by comparing the input boundary with the contents of the boundary memory 1025 storing boundary conditions in past frames. The result of compensation is arithmetically encoded. After that, the boundary memory 1025 stores information of the boundary of the input shape information.

Meanwhile, image data (texture data) of the objects shown in FIG. 50 is input from a terminal 1021 and stored in an object memory 1027. The data stored in the object memory 1027 and the shape memory 1022 are input to a padding unit 1028. This padding unit 1028 pads pixels outside an object, i.e., pixels indicated by black in the shape information, in units of macro blocks in accordance with pixel values in a nearby object. FIG. 52 shows the result of padding. This padding is repeatedly performed vertically and horizontally. The padding unit 1028 inputs padding pixels to macro blocks apart from the objects.

A subtracter 1029 calculates the difference of the image data thus padded from the output data from the motion compensator 1037. A DCT unit 1030 performs DCT for the difference data. A quantizer 1031 quantizes the transformed data by using a predetermined quantization matrix. A coefficient encoder 1032 performs Huffman encoding for the quantized data. An inverse quantizer 1033 inversely quantizes the quantized data. An inverse DCT unit 1034 returns the inversely quantized data to the predicted difference value. This value is added to the output from the motion compensator 1037 to decode the pixel values. The decoded pixel values are stored in an object memory 1036 and used in the next motion compensation. In the P frame or the B frame, the motion compensator 1037 performs motion compensation by comparing the contents in the object memories 1036 and 1027, thereby calculating a predicted value and a motion vector. This motion vector is encoded and input to a synthesizer 1038. The synthesizer 1038 adds a header and the like to the outputs from the arithmetic encoder 1026, the motion compensator 1037, and the coefficient encoder 1032 to form MPEG-4 encoded data. This data is output from a terminal 1039.

Referring back to FIG. 47, a synthesizer 1006 synthesizes outputs from the background encoder 1003 and the object encoder 1005 and adjusts the synthetic data into the form of MPEG-4 encoded data by adding a header and the like. After that, the synthesizer 1006 transmits the data to a communication channel 1008 via a communication interface 1007 or stores the data in a storage device 1009.

In the object extracting method as described above, however, a portion except for a background is processed as an object. Hence, a plurality of objects supposed to be different from each other, e.g., the yacht and the battle ship shown in FIG. 50, are processed as one object. That is, it is very difficult to process these objects as individual objects.

Also, if objects move away from each other in the next frame as shown in FIG. 53, the size of two objects as a whole collected as one object increases. On a decoding side, therefore, the sizes of shape information and texture data of the decoded objects increase to occupy a large area in a memory. This decreases the processing efficiency.

Furthermore, since objects are extracted in units of frames, the interframe relationship between the extracted objects is unknown. This makes encoding using an interframe correlation difficult to perform.

As described above, if an object extracted from an image contains a plurality of objects, these objects are difficult to process as independent objects.

SUMMARY OF THE INVENTION

Accordingly, it is an object of the present invention to provide an image processing apparatus and method capable of performing suitable image processing for an object containing a main object and a secondary object attached to the main object.

According to the present invention, the foregoing object is attained by providing an image processing apparatus comprising: extracting means for extracting at least one object from an image; classifying means for classifying the extracted object into a main object and a secondary object attached to the main object; main object processing means for performing image processing for the main object; and secondary object processing means for performing image processing for the secondary object.

With this arrangement, suitable image processing can be performed for each of a main object and a secondary object, such as a shade, attached to the main object.

And it is another object of the present invention to provide an image processing apparatus and method capable of efficiently encoding an object containing a main object and a secondary object attached to the main object.

According to another aspect of the present invention, the foregoing object is attained by providing an image processing apparatus comprising: extracting means for extracting at least one object from an image; classifying means for classifying the extracted object into a main object and a secondary object attached to the main object; main object encoding means for encoding the main object; and secondary object encoding means for encoding only shape information of the secondary object.

This arrangement improves the encoding efficiency.

And it is another object of the present invention to provide an image processing apparatus and method capable of giving a main object an arbitrary secondary object to be attached to the main object.

In still another aspect of the present invention, the foregoing object is attained by providing an image processing apparatus comprising: object extracting means for extracting at least one main object from an image; secondary object generating means for generating a secondary object to be attached to the main object; main object processing means for performing image processing for the main object; and secondary object processing means for performing image processing for the secondary object.

With this arrangement, a secondary object to be attached to a main object can be appropriately generated and given.

And it is another object of the present invention to provide an image processing apparatus and method capable of extracting an object from a motion image by dividing the object and efficiently encoding the divided objects.

In still another aspect of the present invention, the foregoing object is attained by providing an image processing apparatus comprising: input means for inputting motion image data; object extracting means for extracting at least one object from the motion image and outputting shape information of the object; shape dividing means for dividing the shape information; and object dividing means for dividing the object on the basis of the result of division by said shape dividing means.

Since an object can be properly divided, the size of an image to be encoded can be minimized.

And it is another object of the present invention to provide an image processing apparatus and method capable of efficiently dividing an object in an encoded motion image.

In still another aspect of the present invention, the foregoing object is attained by providing an image processing apparatus comprising: input means for inputting encoded motion image data; separating means for separating the motion image data into encoded data of a background and encoded data of an object; extracting means for extracting shape information from the separated encoded data of the object; shape dividing means for dividing the shape information; and object dividing means for dividing the encoded data of the object on the basis of the result of division by said shape dividing means.

With this arrangement, an encoded object can be efficiently divided without decoding it.

The invention is particularly advantageous since a secondary object such as a shade attached to a main object can be freely controlled.

For example, natural image synthesis having no artificialness is realized with a small information amount by reflecting the image processing result of a main object on the image processing result of a shade.

Additionally, even for an object having no shade, a shade can be generated on the basis of the shape of the object and added. This allows more natural image synthesis.

Also, according to the present invention, a plurality of objects in a motion image can be divided while an interframe correlation is checked. This makes efficient encoding possible.

Accordingly, editing and the like can be efficiently performed in units of objects in an image, and data can be efficiently transferred and stored.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 5 is a view for explaining the contents of an object table in the first embodiment;

FIG. 34 is a view showing an example of an object region in the fourth embodiment;

FIG. 37 is a view for explaining a shape information difference in the fourth embodiment;

FIGS. 43A and 43B are views for explaining histograms in the fifth embodiment;

FIG. 45 is a view for explaining division of macro blocks in the fifth embodiment;

FIGS. 46A and 46B are views for explaining histograms in the fifth embodiment;

DETAILED DESCRIPTION OF THE PREFERRED EMBODIMENTS

Preferred embodiments of the present invention will now be described in detail below in accordance with the accompanying drawings.

First Embodiment

Figure 1:
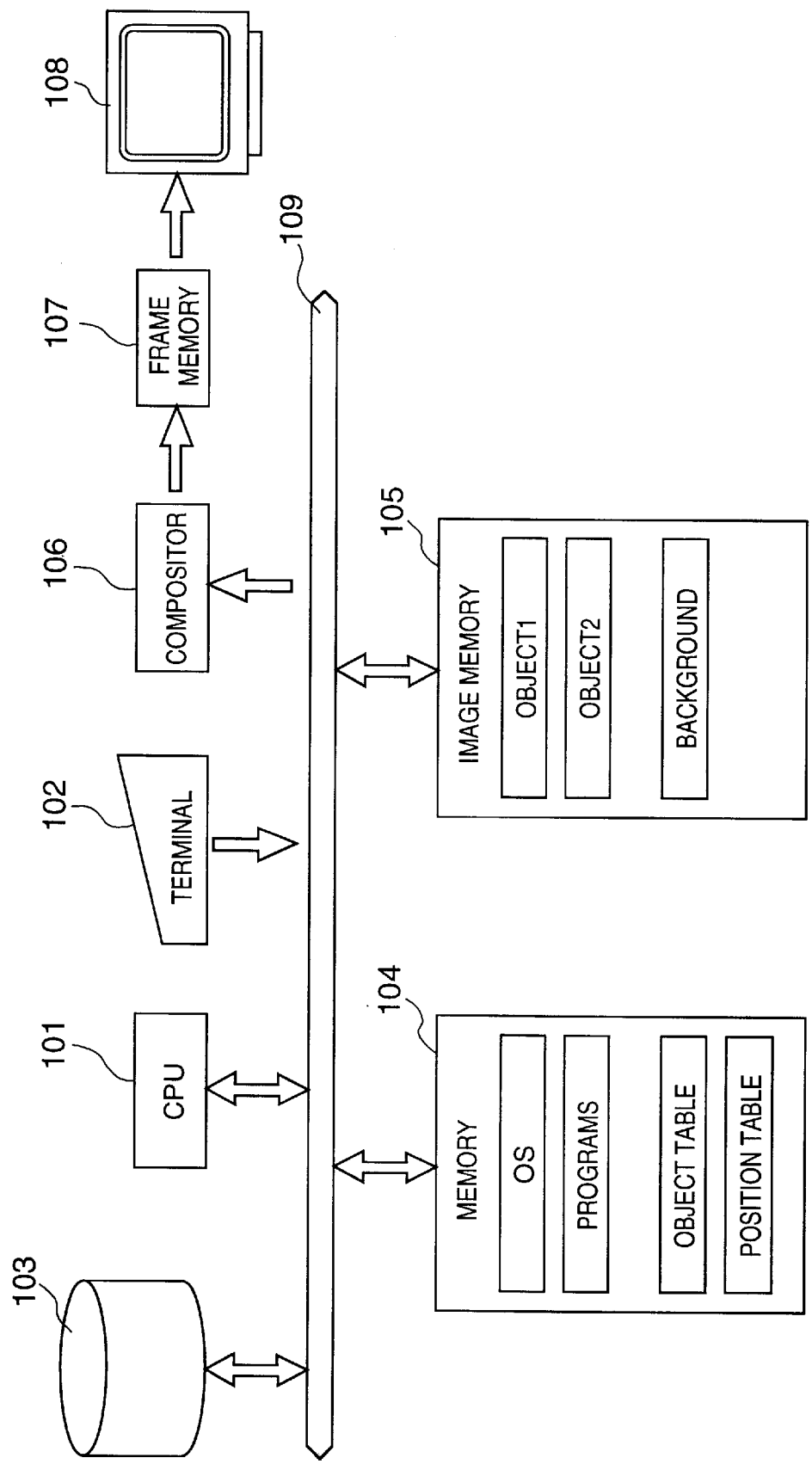
FIG. 1 is a block diagram showing the arrangement of a motion image edit apparatus in the first embodiment according to the present invention.

FIG. 1 is a block diagram showing the arrangement of a motion image edit apparatus according to the first embodiment. In this embodiment, image editing is realized by software processing using a CPU. Referring to FIG. 1, a CPU 101 executes application programs and controls the whole apparatus. A terminal 102 is used by a user to designate edit processing. A storage device 103 stores image data to be used in editing. A memory 104 stores an OS for controlling the whole apparatus, application programs to be used by the CPU 101, and work memories necessary for various processes. An image memory 10S stores image data necessary for various works. A compositor 106 synthesizes images. A frame memory 107 stores synthesis results. A monitor 108 displays the contents of the frame memory 107. A bus 109 transfers various data, control commands, and image data between the individual components.

Figure 21:
FIG. 21 is a view showing a frame image in a motion image containing an object.
Figure 22:
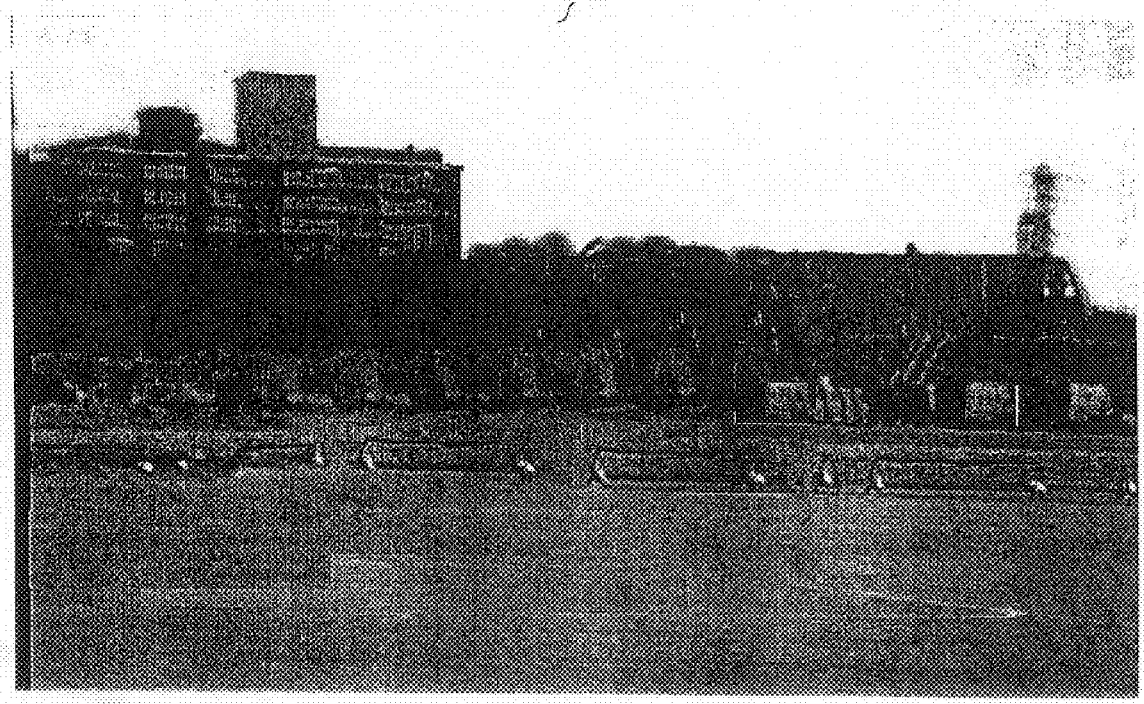
FIG. 22 is a view showing a background image containing no object.
Figure 23:
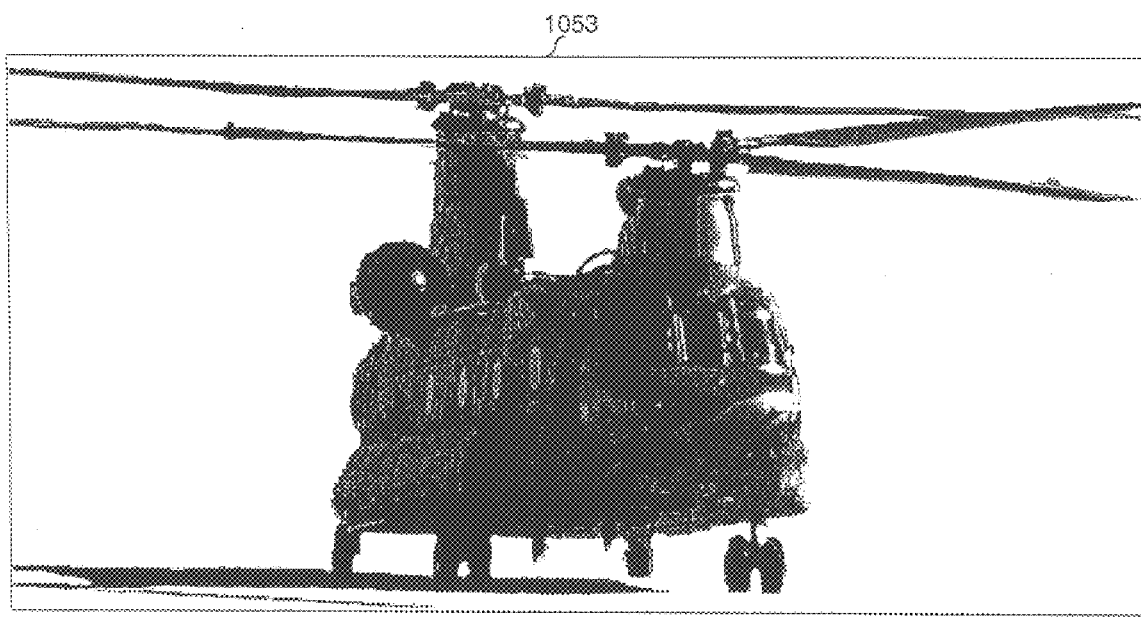
FIG. 23 is a view showing an extracted object.
Figure 24:
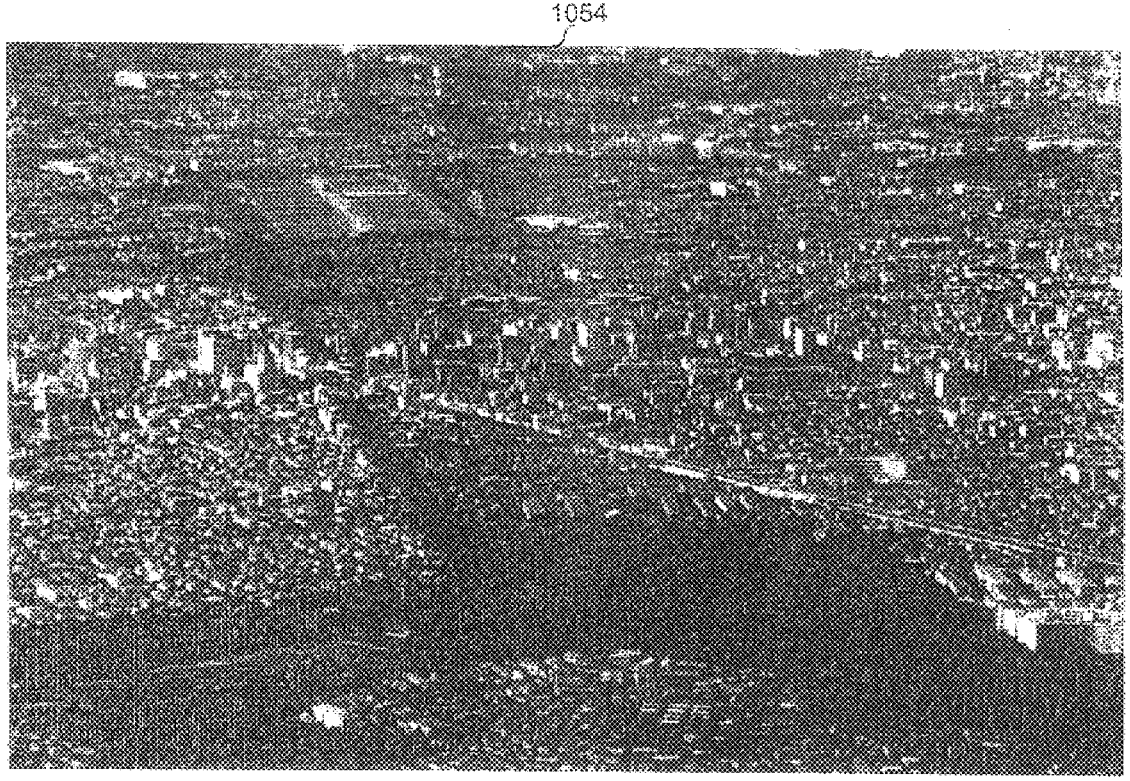
FIG. 24 is a view showing a background image to be synthesized.

In this arrangement a user first activates the entire apparatus from the terminal 102. At this terminal 102, the user also selects a background image to be used in image synthesis and an image containing an object to be synthesized on the background image. Assume, for example, that the user selects an image 1054 shown in FIG. 24 as a background image to be synthesized and an image 1050 containing a helicopter 1051 shown in FIG. 21 as an image containing an object. At the same time, a background image 1052 shown in FIG. 22 is also selected as an original background image of the image 1050 containing an object. These images are stored in the storage device 103 after being encoded by a predetermined coding system.

Figure 2:
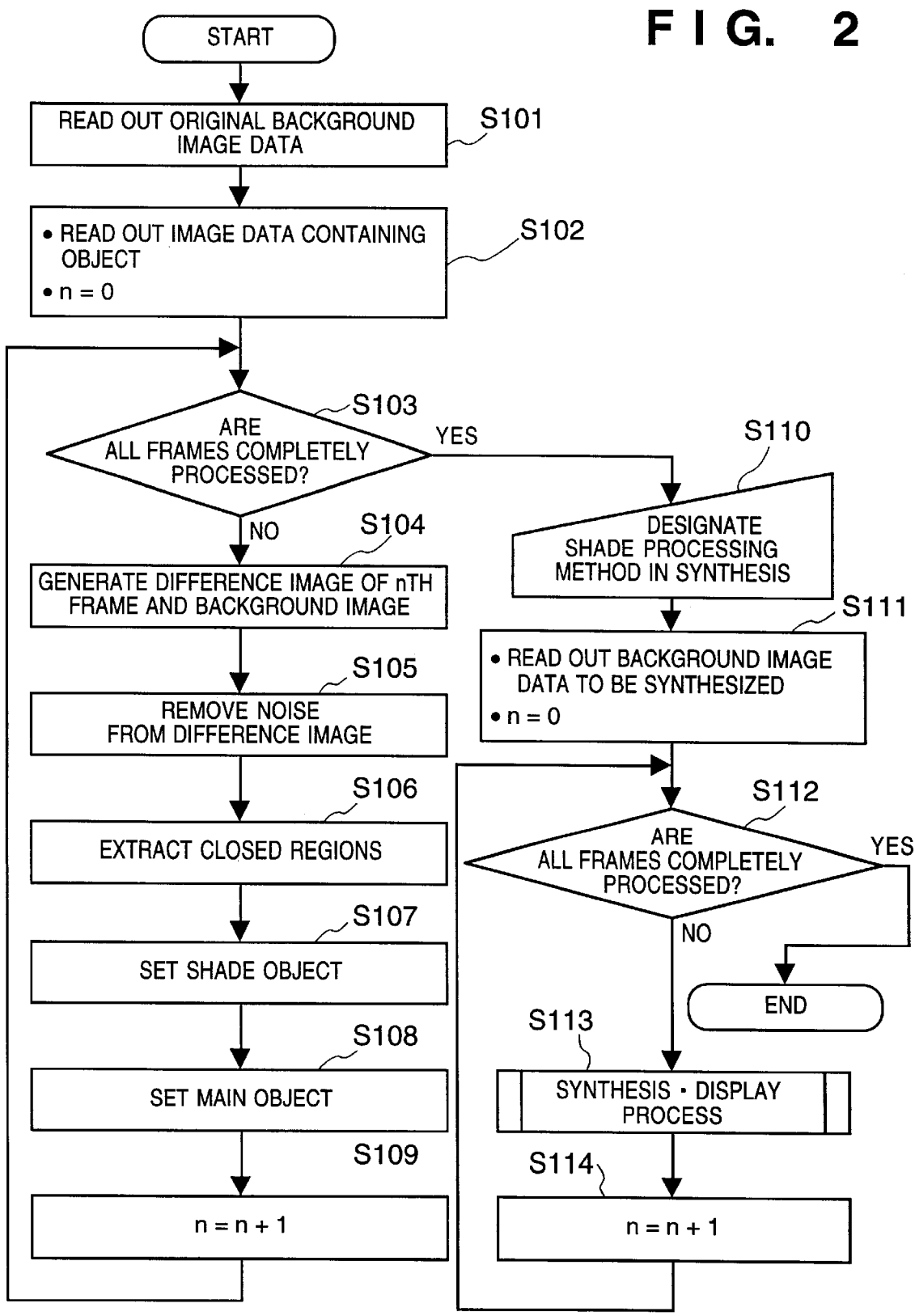
FIG. 2 is a flow chart showing an image edit procedure in the first embodiment.

Subsequently, image synthesis is performed. FIG. 2 is a flow chart showing this procedure. The processing shown in this flow chart is held as a program in the memory 104 and executed by the CPU 101.

First, the CPU 101 reads out motion image data of the original background image 1052 shown in FIG. 22 from the storage device 103 and writes the data in a predetermined area of the image memory 105 (step S101). The CPU 101 then reads out motion image data of the image 1050 containing the helicopter 1051 from the storage device 103 and writes the data in a predetermined area of the image memory 105 (step S102). Simultaneously, the CPU 101 sets a frame counter n to 0. Note that these background image and image containing the object must be previously designated by the user at the terminal 102, but the method of designation is not particularly limited. Note also that if image data to be read out is encoded data, the CPU 101 decodes the data and writes the decoded data in the image memory 105.

After that, the CPU 101 performs object extraction in units of frames in accordance with the frame counter n. First, the CPU 101 obtains a difference image of an nth-frame image and the background image 1052 (step S104). The CPU 101 then removes noise by changing pixel values having a predetermined threshold value or less in this difference image to 0 (step S105). The CPU 101 divides a group of pixels having pixel values of 0 or more into closed regions, extracts only closed regions having a predetermined size or bigger, and writes the extracted regions in a predetermined area (Object1) of the image memory 105 (step S106).

Figure 3:
FIG. 3 is a view showing a shade as a secondary object in the first embodiment.

In step S107, the CPU 101 extracts regions having substantially equal difference values between adjacent pixels from the closed regions held in Object1 of the image memory 105 and writes the extracted regions in the frame memory 107. The CPU 101 displays the result on the monitor 108. On the basis of the displayed image, the user selects a shade region by designating it at the terminal 102. By this operation, the shade region is extracted. Of the pixels in the closed regions held in Object1, the CPU 101 writes pixels contained in the designated shade region into a predetermined area (Object2) of the image memory 105. Furthermore, the CPU 101 writes the position, size, and the like of this shade region in the frame into a position table of the memory 104 by regarding the shade region as the shade of the object, and also registers the shade region in, e.g., No. 1 of an object table by regarding the shade region as one object (secondary object). An image of the shade as a secondary object thus obtained is a shade 1060 shown in FIG. 3.

Figure 4:
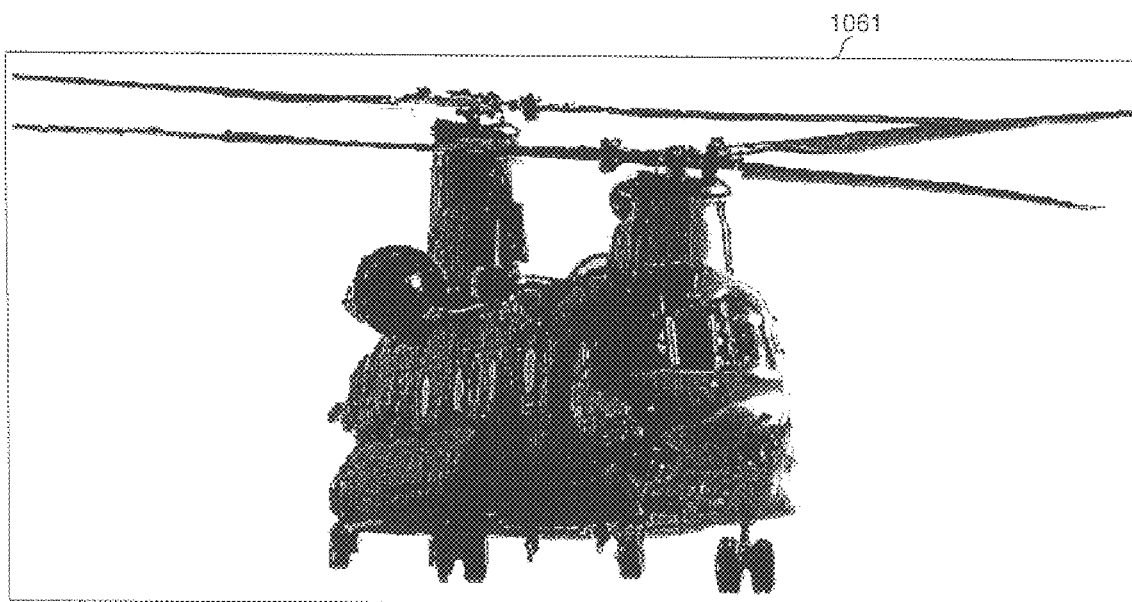
FIG. 4 is a view showing a main object in the first embodiment.

In step S108, of the pixels in the closed regions held in Object1, the CPU 101 removes pixels except for pixels contained in the region of an object (main object) to be synthesized. That is, the CPU 101 generates a main object by removing the shade region as the secondary object from the closed region of the object. The CPU 101 registers this main object in, e.g., No. 2 of the object table in the memory 104 and writes the position, size, and the like of the main object in the frame into the position table. At the same time, the CPU 101 writes number "1" of the object table, in which the shade as the secondary object pertaining to the main object is registered, into the second cell of a LINK column in the object table (step S108). An image of the main object thus obtained is a helicopter 1061 shown in FIG. 4.

Figure 5:
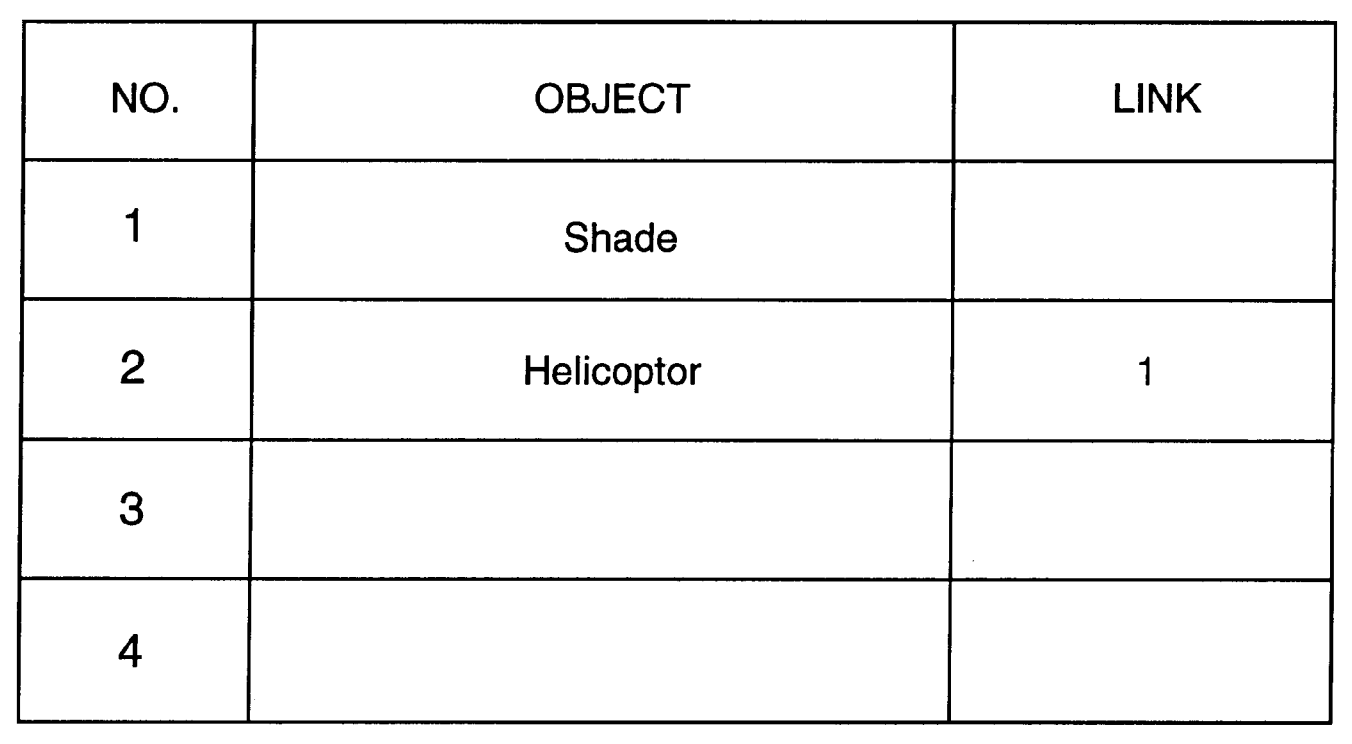

FIG. 5 shows an example of data written in the object table of the memory 104 as a result of the above processing. Referring to FIG. 5, the secondary object, "Shade", indicating the shade is registered in No. 1, and the main object, "Helicopter", indicating the helicopter is registered in No. 2. The LINK column shows that this main object is linked to the secondary object registered in No. 1.

The CPU 101 increments the frame counter n (step S109) and returns to step S103 to process the next frame. Note that after the first frame, a shade region can be extracted without confirmation by the user by selecting a region having an average difference value close to the average difference value of a difference image indicating the shade obtained in the immediately preceding frame. While the frame counter n is smaller than the total number of frames to be processed (step S103), the CPU 101 repeats the processes in steps S104 to S109.

Referring back to FIG. 2, if the frame counter n exceeds the total number of frames (step S103), the CPU 101 demands the user to input a shade processing method, and the user inputs the processing method from the terminal 102 (step S110). This shade processing method is to either leave the shade behind after synthesis or delete the shade because its existence in a synthetic image is inconvenient. After that, the CPU 101 reads out image data of the image 1054 (FIG. 24) to be used as a new background by image synthesis and writes the data in a predetermined region (Background) of the image memory 105 (step S111). At the same time, the CPU 101 sets the frame counter n to 0. The CPU 101 then sequentially synthesizes the main object and/or the secondary object with the background image from the first frame and displays the obtained synthetic image on the monitor 108 (step S113).

Figure 6:
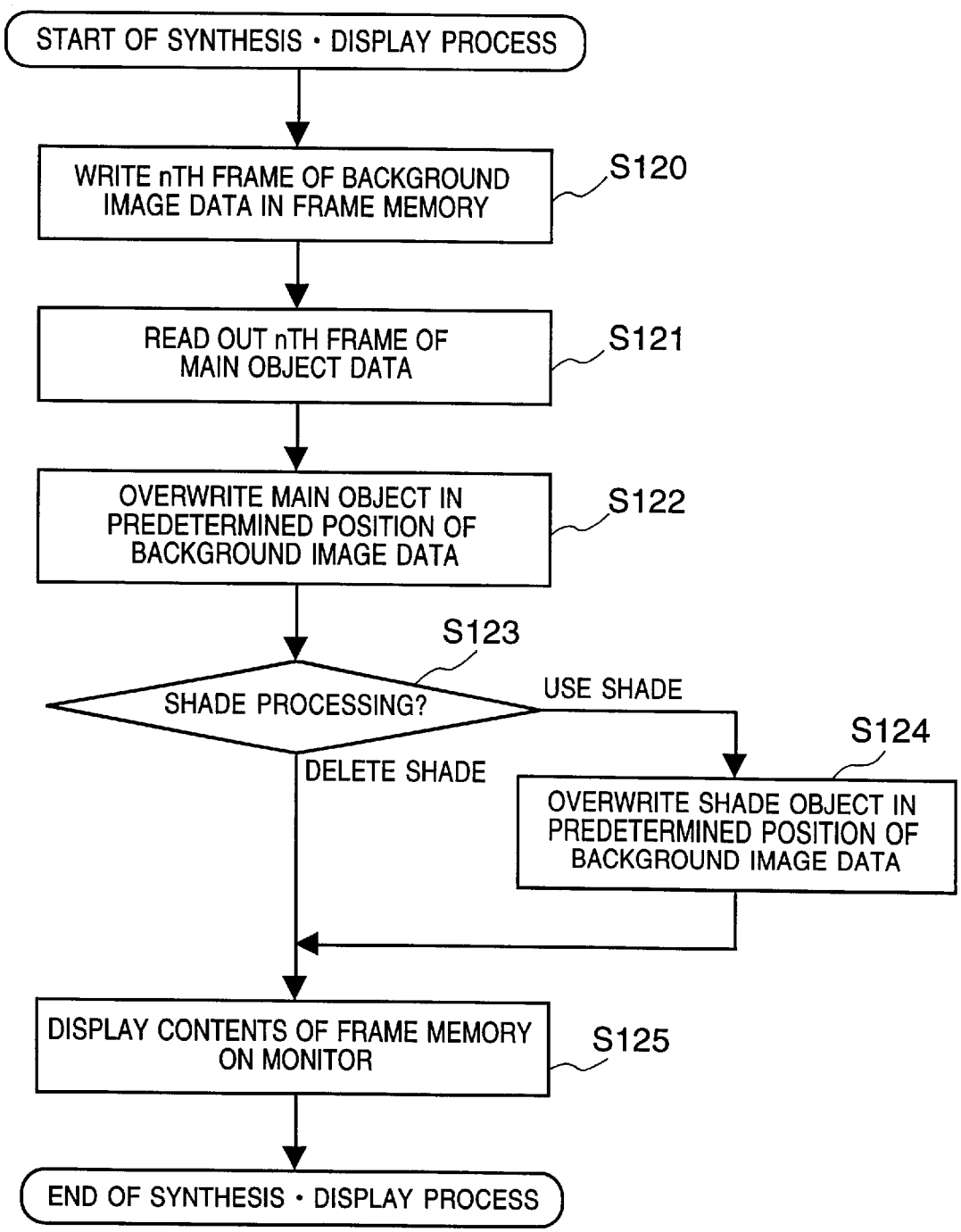
FIG. 6 is a flow chart showing a synthesis display procedure in the first embodiment.

Details of the synthesis. Display process shown in step S113 will be described below with reference to a flow chart shown in FIG. 6.

First, the CPU 101 writes an nth frame of the background image 1054 into the frame memory 107 (step S120). Subsequently, the CPU 101 reads out the image of the helicopter 1061 (FIG. 4) as the main object registered in the object table from Object1 of the image memory 105 (step S121). The CPU 101 over writes the readout image in a position indicated by the position table in the frame memory 107 or in a new position designated by the user (step S122). Note that in the object table of the memory 104, an object having "1" and the like description in the LINK column is regarded as a main object. In the example shown in FIG. 5, "Shade" registered in No. 1 of the object table is regarded as a secondary object, and "Helicopter" registered in No. 2 is regarded as a main object to be synthesized.

The CPU 101 then performs shade processing in accordance with the shade processing method, i.e., overwrite or delete, previously designated in step S110 (step S123) If the shade is to be used, the CPU 101 reads out the shade 1060 as the corresponding secondary object from Object2 in the image memory 105 on the basis of the description in the LINK column of the main object in the object table, and overwrites the shade 1060 on the frame memory 107 in accordance with the positional relationship between the shade and the helicopter 1061 as the main object indicated in the position table (step S124) After that, the flow advances to step S125.

Figure 7:
FIG. 7 is a view showing the result of image synthesis in the first embodiment.
Figure 25:
FIG. 25 is a view showing the result of conventional image synthesis.

If the shade is to be deleted, the CPU 101 immediately advances to step S125 by ignoring the secondary object. For example, in synthesis with the background image 1054 shown in FIG. 24, the existence of the shade of the object 1061 is inconvenient as shown in FIG. 25, so a shade delete is desirably selected. In step S125, the CPU 101 displays the contents of the frame memory 107 on the monitor 108. FIG. 7 shows the image thus synthesized and displayed.

Referring back to FIG. 2, after completing the synthesis.display process in step S113 explained above, the CPU 101 increments the frame counter n (step S114), and repeats the synthesis.display process for all frames. If the frame counter n exceeds the total number of frames (step S112), the CPU 101 completes the whole processing.

In the first embodiment as described above, a shade region is extracted from an object to be synthesized and selectively processed in accordance with, e.g., the condition of a background image. Consequently, a synthetic image having no artificialness can be easily formed.

In this embodiment, a shade region and a main object are extracted on the basis of a difference image from a background. However, the present invention is not limited to this method. For example, it is possible to use the extraction method described in "Morphological Segmentation Using Advance Knowledge Information in Sports Programs" (1997 Image Media Processing Symposium (IMPS97) I-3.15, Oct. 8th, 1997, Naemura et al.) explained in "DESCRIPTION OF THE RELATED ART".

Also, the image data stored in the storage device 103 can be encoded data. If this is the case, the data can be divisionally encoded in units of objects by, e.g., the MPEG-4 coding system, or a shade and an object can be separately stored.

Furthermore, processing one frame of a motion image is equivalent to processing a still image. Accordingly, the same effect as in this embodiment can naturally be obtained for a still image by performing the same operation as in the embodiment for the image.

Although one object is processed in this embodiment, the number of objects is not restricted to one. That is, a plurality of objects can be processed in accordance with the capacity of each table in the memory 104 and the storage area in the image memory 105.

Second Embodiment

The second embodiment according to the present invention will be described below.

Figure 8:
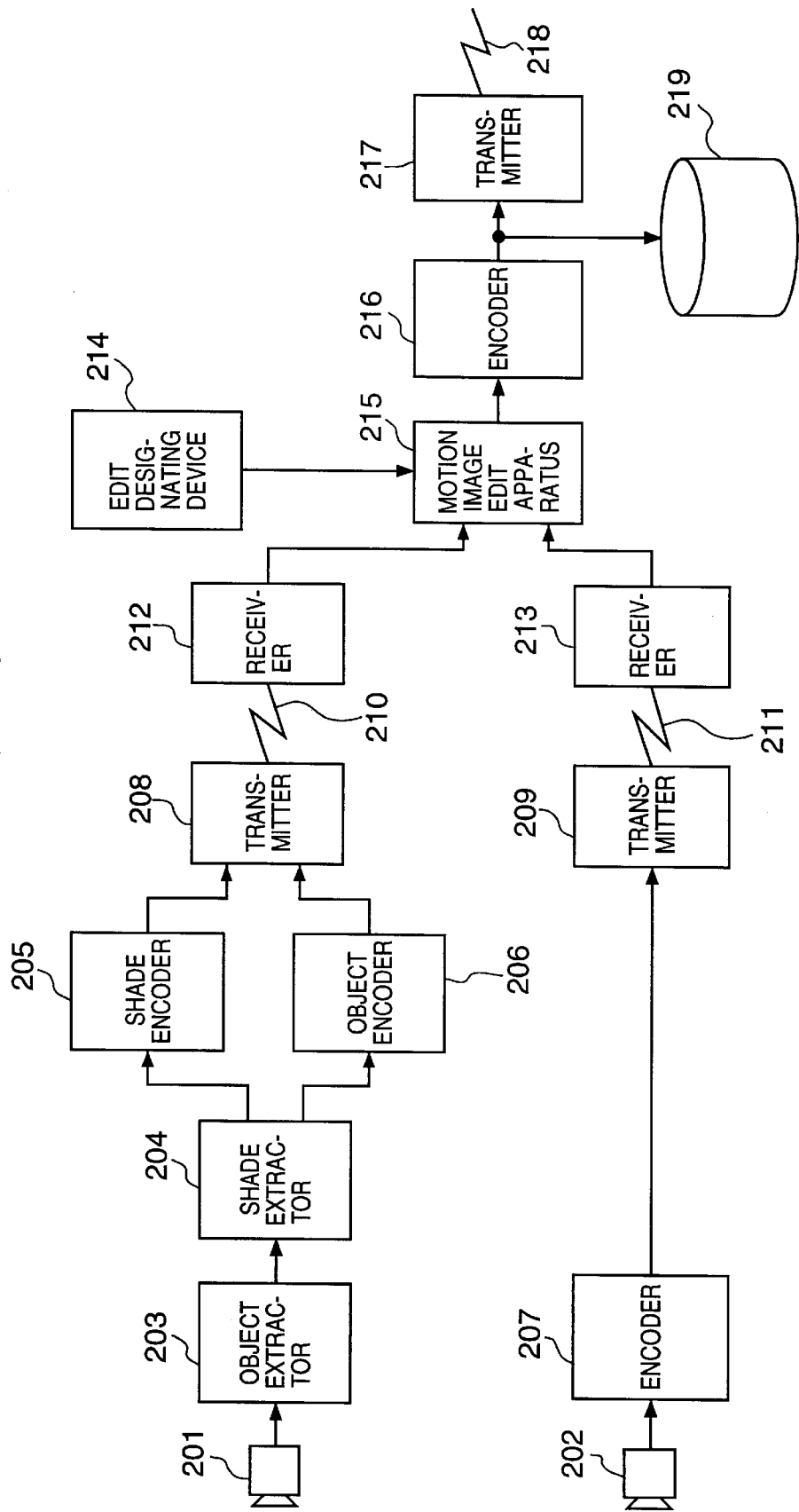
FIG. 8 is a block diagram showing the arrangement of a motion image edit system in the second embodiment according to the present invention.
Figure 26:
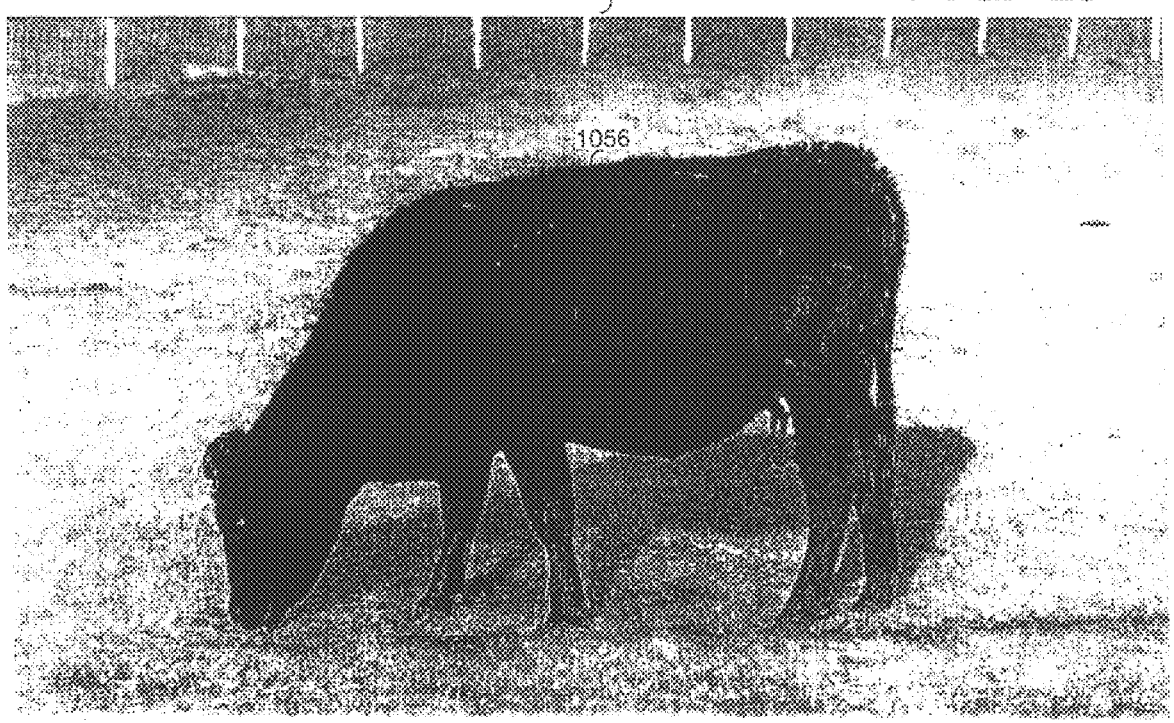
FIG. 26 is a view showing a frame image in a motion image containing an object.
Figure 27:
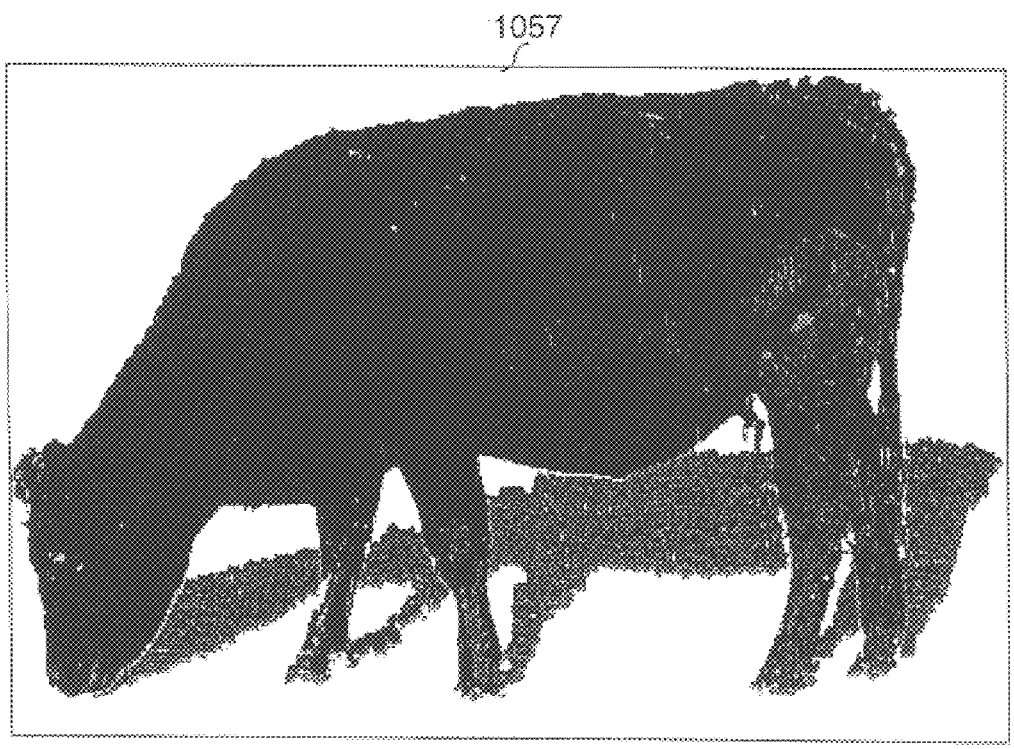
FIG. 27 is a view showing an extracted object.

FIG. 8 is block diagram showing the arrangement of a motion image edit system in the second embodiment. Referring to FIG. 8, TV cameras 201 and 202 sense motion images and output these images after converting them into digital signals. Note that the TV camera 201 senses an image 1055 shown in FIG. 26 as an image containing an object and the TV camera 202 senses an image 1070 shown in FIG. 9 as a background image. An object extractor 203 extracts the object from the motion image. A shade extractor 204 extracts, from the extracted object, a secondary object (shade object) indicating a region representing the shade of the extracted object. The shade extractor 204 also outputs a main object by removing the shade object from the extracted object. A shade encoder 205 encodes the extracted shade object. An object encoder 206 encodes the main object. In this embodiment, the object encoder 206 encodes the main object as a motion image in accordance with the MPEG-4 coding system. However, the coding system is not limited to this system.

An encoder 207 encodes the motion image sensed by the TV camera 202. Although a coding system for this encoding is also not particularly restricted, the MPEG-1 coding system is used in this embodiment. Transmitters 208 and 209 transmit the generated encoded data to communication channels 210 and 211, respectively. Receivers 212 and 213 receive the encoded data. An edit designating device 214 is used by a user to designate the contents of editing. A motion image edit apparatus 215 is the characteristic feature of this embodiment. An encoder 216 encodes the data in accordance with the MPEG-1 coding system. However, the coding system is not particularly limited. A transmitter 217 transmits the encoded data to a communication network 218. A storage device 219 stores the encoded data.

Figure 10:
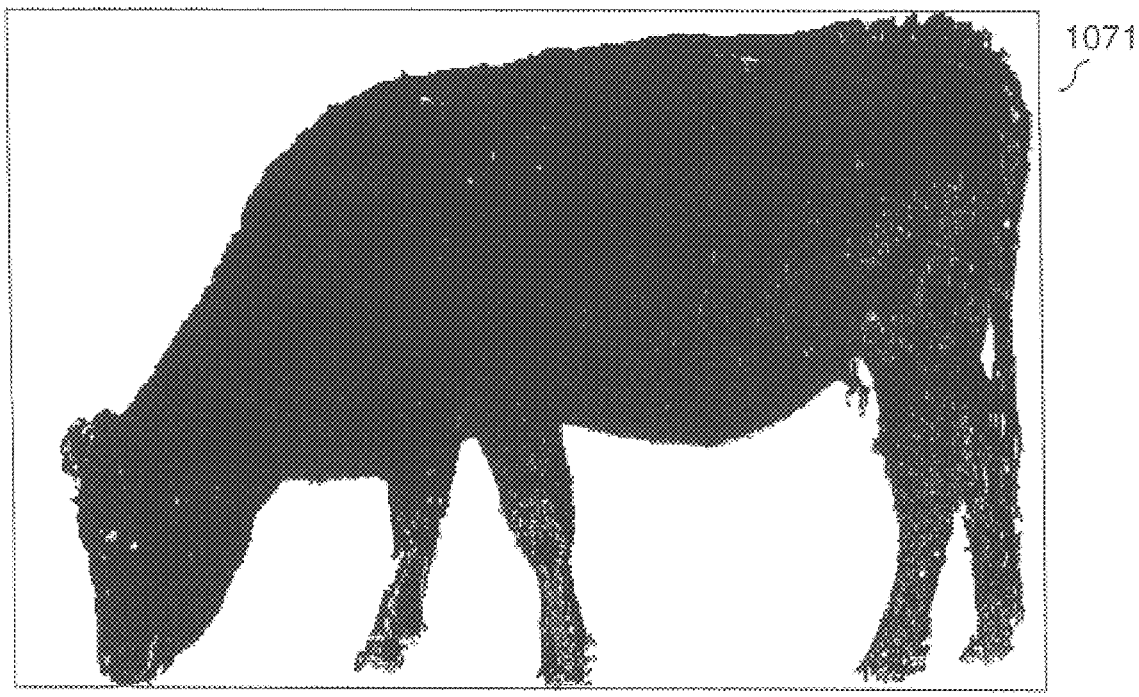
FIG. 10 is a view showing a main object in the second embodiment.
Figure 11:
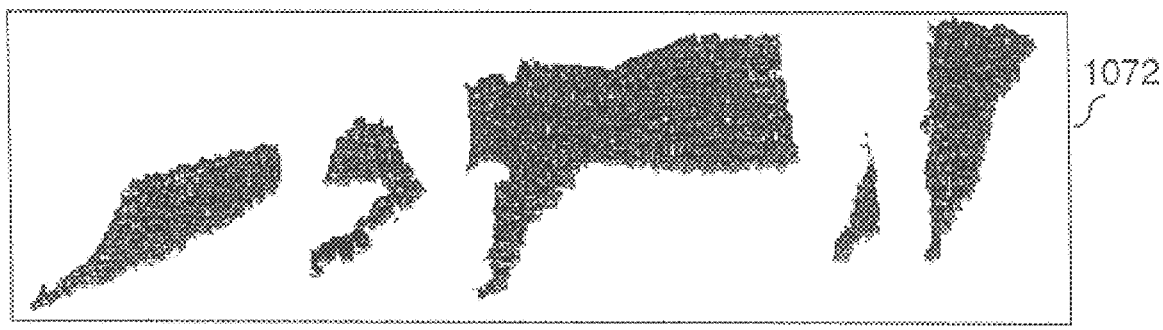
FIG. 11 is a view showing a shade object in the second embodiment.

The operation of the motion image edit system of the second embodiment with the above arrangement will be described below. First, the TV cameras 201 and 202 sense motion images, and these motion images are encoded. The object extractor 203 extracts an object region containing a main object and its shade object from the input motion image from the TV camera 201. This extraction method is not particularly limited. For example, it is possible to use the method (steps S104 to S109 in FIG. 2) explained in the first embodiment by which a sensed background image is previously stored and an object region is extracted from a difference image. Some other method can also be used. In the second embodiment, a cattle 205b and its shade are extracted as an object region from an image 1055 on the basis of a previously sensed background image. The extracted object region is input to the shade extractor 204 and separated into a main object and its shade object. This separation method is not particularly restricted. For example, the region can be separated on the basis of the uniformity of difference values from the background as explained in the first embodiment, or the user can perform manual extraction. FIGS. 10 and 11 show a cattle object 1071 as the main object and a shade object 1072, respectively, extracted as above. Note that each extracted object is essentially cut out as a rectangular region containing the object.

The extracted cattle object 1071 is input to the object encoder 206 and encoded by the MPEG-4 coding system. This MEPG-4 coding system encodes mask information representing the shape of the object and pixel values of a texture.

The extracted shade object 1072 is input to the shade encoder 205. The shade encoder 205 encodes the shape and the intensity of the shade in the same manner as in the MPEG-4 coding system.

The shade extractor 204 outputs, to the shade encoder 205, an image corresponding to the position of the shade object in the previously sensed background image referred to by the object extractor 203 in the preceding stage.

Figure 12:
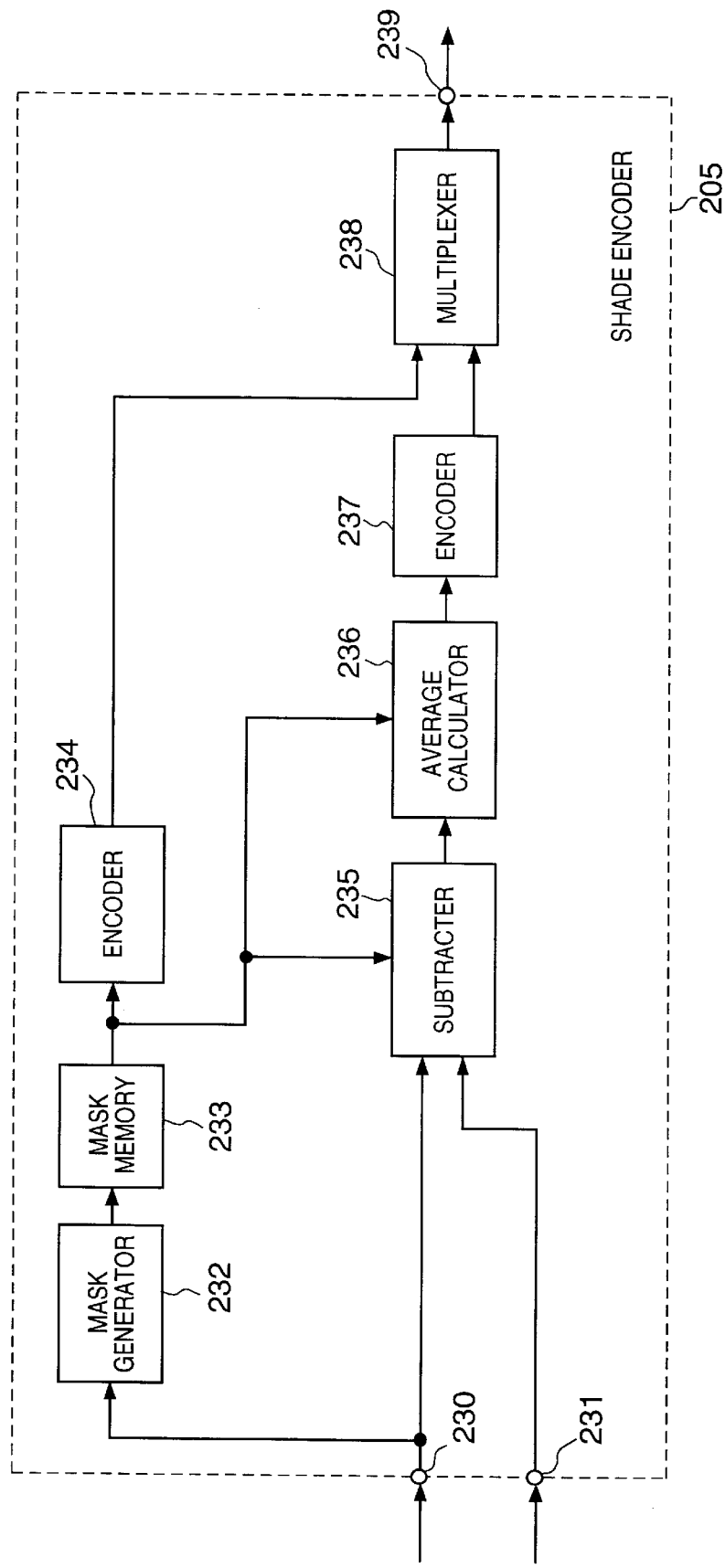
FIG. 12 is a block diagram showing the arrangement of a shade encoder in the second object.

FIG. 12 is a block diagram showing the shade encoder 205. Referring to FIG. 12, a terminal 230 inputs an image in the rectangular region containing the shade object from the shade extractor 204. A terminal 231 inputs a background image in the shade object region from the shade extractor 204. A mask generator 232 generates a mask indicating the shape information of the shade object by expressing whether a pixel is contained in the shade object by using a 1/0 binary image. A mask memory 233 stores the mask. An encoder 234 arithmetically encodes the contents of the mask memory 233. For a pixel found to exist in the shade region by the mask, a subtracter 235 calculates a difference between the pixel value of a pixel in the shade object and the pixel value of a background pixel in the same position. An average value calculator 236 divides the total sum of the calculated difference values by the number of pixels having a pixel value of 1 in the mask, i.e., the number of pixels existing in the shade object, thereby calculating the average value. An encoder 237 assigns a code to the calculated average value. A multiplexer 238 multiplexes and adjusts the codes generated by the encoders 234 and 237. A terminal 239 outputs the synthetic encoded data.

The operation of the shade encoder 205 with the above arrangement will be described below. The image (shade object 1072) containing the shade object is input from the terminal 230 to the mask generator 232 and the subtracter 235.

Figure 13:
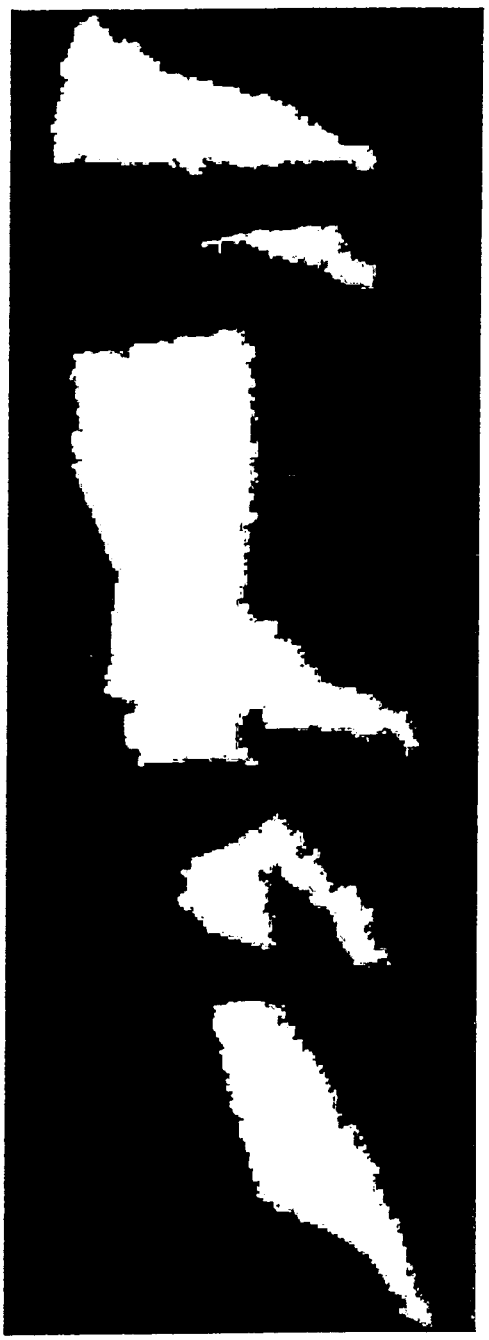
FIG. 13 is a view showing a mask of the shade object in the second embodiment.

The mask generator 232 determines whether a pixel is contained in the shade object by checking if the pixel exists inside or outside the closed region of the shade. The mask generator 232 outputs the result as a mask of a 1/0 binary image. That is, this mask indicates the shape information of the shade object. FIG. 13 shows the mask information of the shade object 1072 shown in FIG. 11. The mask memory 233 stores this mask. The encoder 234 encodes the binary mask stored in the mask memory 233.

The subtracter 235 calculates differences between pixels values of the shade object and the background image, and inputs the calculated differences to the average value calculator 236. The average value calculator 236 calculates the total sum of these differences and divides this total sum by the number of pixels having a pixel value of "1" in the mask stored in the mask memory 233, i.e., the number of pixels existing in the shade region, thereby calculating the average value. The encoder 237 encodes this average value.

The multiplexer 238 multiplexes and adjusts the encoded data generated by the encoders 234 and 237 and outputs the synthetic data from the terminal 239.

Referring back to FIG. 8, the transmitter 208 receives and adjusts the encoded data generated by the object encoder 206 and the encoded data generated by the shade encoder 205, and transmits the data to the communication channel 210.

Meanwhile, the image data sensed by the TV camera 202 is encoded by the encoder 207 in accordance with the MPEG-1 coding system and transmitted to the communication channel 211 via the transmitter 209. This image data sensed by the TV camera 202 is the background image (the background image 1070 shown in FIG. 9) of a synthetic image.

The receivers 212 and 213 receive these encoded data and input the data to the motion image edit apparatus 215. The motion image edit apparatus 215 edits the motion images in accordance with designation input from the edit designating device 214 by the user.

Assume that the position of the object to be synthesized in the background image 1070, the size of the object, and the intensity of the shade are input to the motion image edit apparatus 215 as the edit designation by the user.

Figure 14:
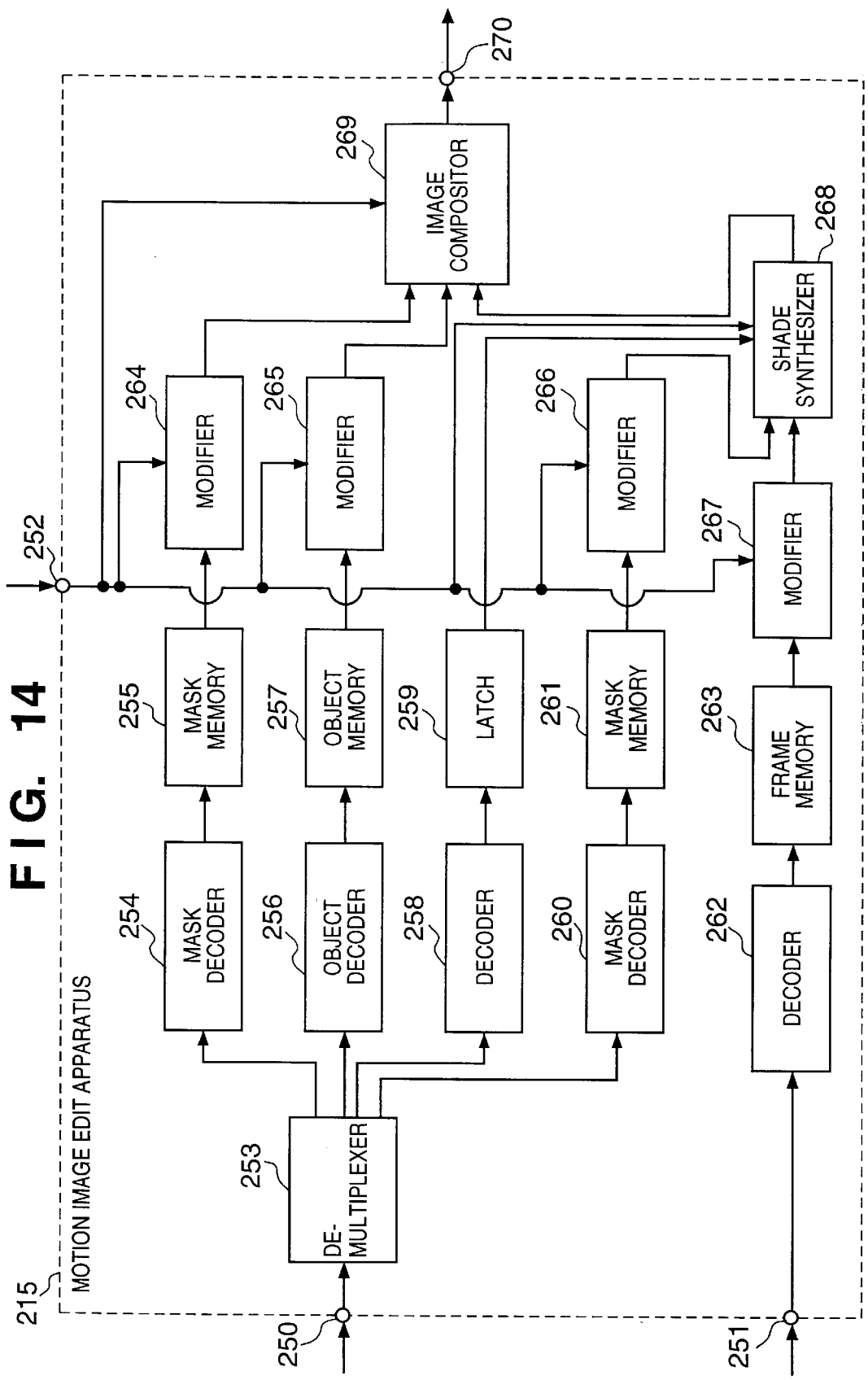
FIG. 14 is a block diagram showing the arrangement of a motion image edit apparatus in the second embodiment.

FIG. 14 is a block diagram showing the motion image edit apparatus 215. Referring to FIG. 14, a terminal 250 inputs the encoded data of the object to be synthesized from the receiver 212. A terminal 251 inputs the encoded data of the image as the background from the receiver 213. A terminal 252 inputs the edit designation from the edit designating device 214. A demultiplexer 253 demultiplexes the input encoded data from the receiver 212 into encoded data representing the shape of the main object, encoded data of the pixel values of the main object, encoded data indicating the intensity of the shade, and encoded data indicating the shape of the shade. A mask decoder 254 decodes the mask information representing the shape of the main object. A mask memory 255 stores the decoded data. An object decoder 256 decodes the pixel values of the main object. An object memory 257 stores the decoded data. A decoder 258 decodes the shade intensity. A latch 259 stores the decoded data. A mask decoder 260 decodes the mask information representing the shade shape. A mask memory 261 stores the decoded data.

A decoder 262 decodes the input encoded data of the background image from the receiver 213 in accordance with the MPEG-1 coding system. A frame memory 263 stores the decoded data. Modifiers 264, 265, 266, and 267 modify the input image, e.g., perform a magnification process of enlargement or reduction, rotation process, and affine transformation for the input image in accordance with the designation from the edit designating device 214. A shade synthesizer 268 synthesizes the shade object onto the background image in accordance with the designation from the edit designating device 214. An image compositor 269 synthesizes the main object modified by the modifiers 264 and 265 onto the output from the shade synthesizer 268. A terminal 270 outputs the synthetic data.

The operation of the motion image edit apparatus 215 with the above arrangement will be described below. The terminal 250 inputs the encoded data received by the receiver 212 to the demultiplexer 253. The demultiplexer 253 demultiplexes the encoded data by referring to the header or the like of each code and outputs the demultiplexed data to the corresponding decoders in the succeeding stage. That is, the demultiplexer 253 outputs the encoded data representing the shape of the main object to the mask decoder 254, the encoded data of the pixel values of the main object to the object decoder 256, the encoded data of the shade intensity to the decoder 258, and the encoded data of the mask of the shade object to the mask decoder 260.

The mask decoder 254 decodes the mask data of the main object to reconstruct the mask information and stores the information in the mask memory 255. The object decoder 256 decodes the encoded data of the image of the main object to reconstruct the pixel values of the main object and stores the pixel values in the object memory 257. The decoder 258 decodes the shade intensity of the shade object and stores the shade intensity in the latch 259. The mask decoder 260 decodes the mask data of the shade object to reconstruct the mask information and stores the information in the mask memory 261. The decoder 262 decodes the encoded data of the background image to reconstruct the pixel values of the background image and stores the pixel values in the frame memory 263.

The edit designating device 214 inputs parameters for the modification processes, e.g., the magnification process of enlargement or reduction, rotation process, and affine transformation to the modifiers 264, 265, 266, and 267. In the following description, assume that the object is synthesized after being reduced in accordance with the size of the background image. The modifiers 264, 265, and 266 receive a reduction ratio as a parameter from the edit designating device 214. The modifier 264 reduces the contents of the mask memory 255 and outputs the result. The modifier 265 reduces the contents of the object memory 257 and outputs the result. The modifier 266 reduces the contents of the mask memory 261 and outputs the result. Since only the object needs to be reduced in this case, the modifier 267 for modifying the background image directly outputs the contents of the frame memory 263.

On the basis of an average value m representing the shade intensity stored in the latch 259 and a shade intensity change parameter p input from the edit designating device 214, the shade synthesizer 268 calculates intensity S of the shade to be actually synthesized in accordance with $$S = m \times p \tag{1}$$

In addition, the shade synthesizer 268 determines the position of synthesis of the shade object on the basis of the position of synthesis of the main object input from the edit designating device 214 and the relative positional relationship between the main object and the shade object. The shade synthesizer 268 then synthesizes the shade object in the calculated position of the result of modification of the background image output from the modifier 267. More specifically, in accordance with the result of modification of the mask information held in the mask memory 261, i.e., the shape information of the shade to be synthesized, a pixel in the position of synthesis of the shade object is converted into a new pixel value C obtained on the basis of a pixel value b of the background image and the shade intensity S by $$C = b - S \tag{2}$$

The background image on which the shade object is thus synthesized is input to the image compositor 269. In accordance with the position of synthesis of the main object input from the edit designating device 214 and the result of modification of the mask data (shape information) of the main object held in the mask memory 255, the image compositor 269 replaces the pixel value of the background image with the pixel value of the main object for a pixel into which the main object is to be synthesized. The image compositor 269 outputs the result of this synthesis from the terminal 270 to the encoder 216 shown in FIG. 8.

Figure 9:
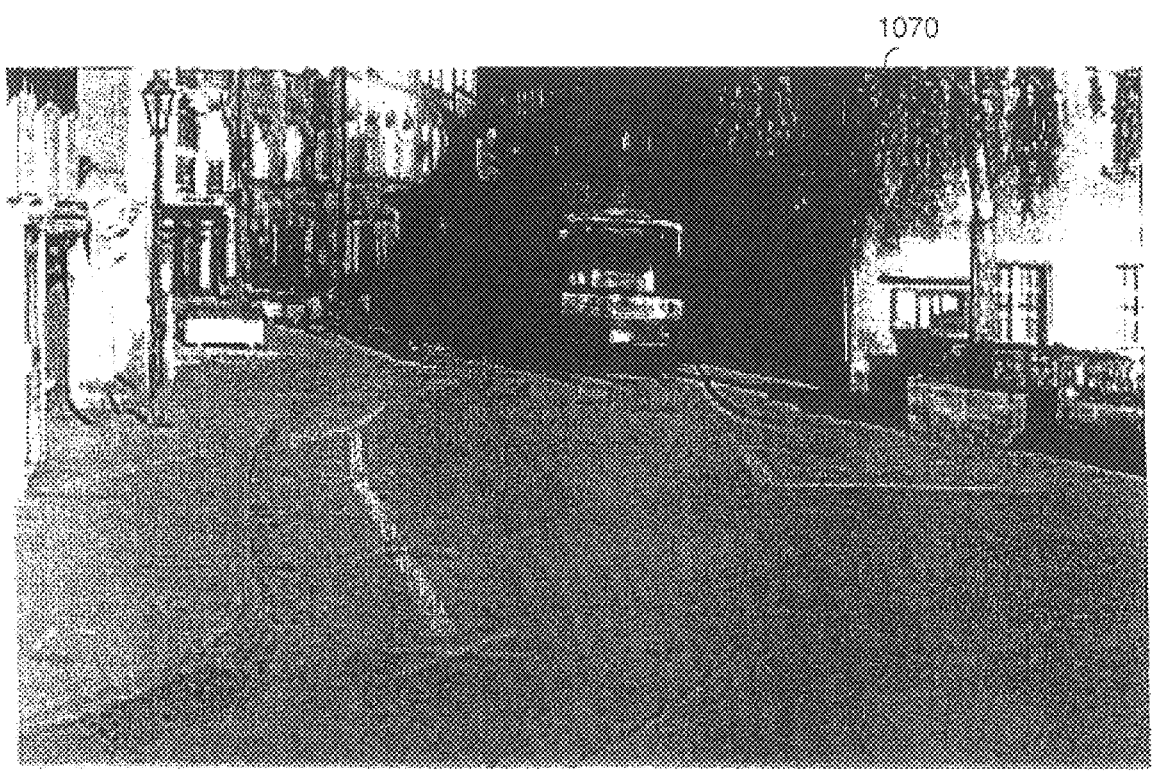
FIG. 9 is a view showing a background image in the second embodiment.
Figure 15:
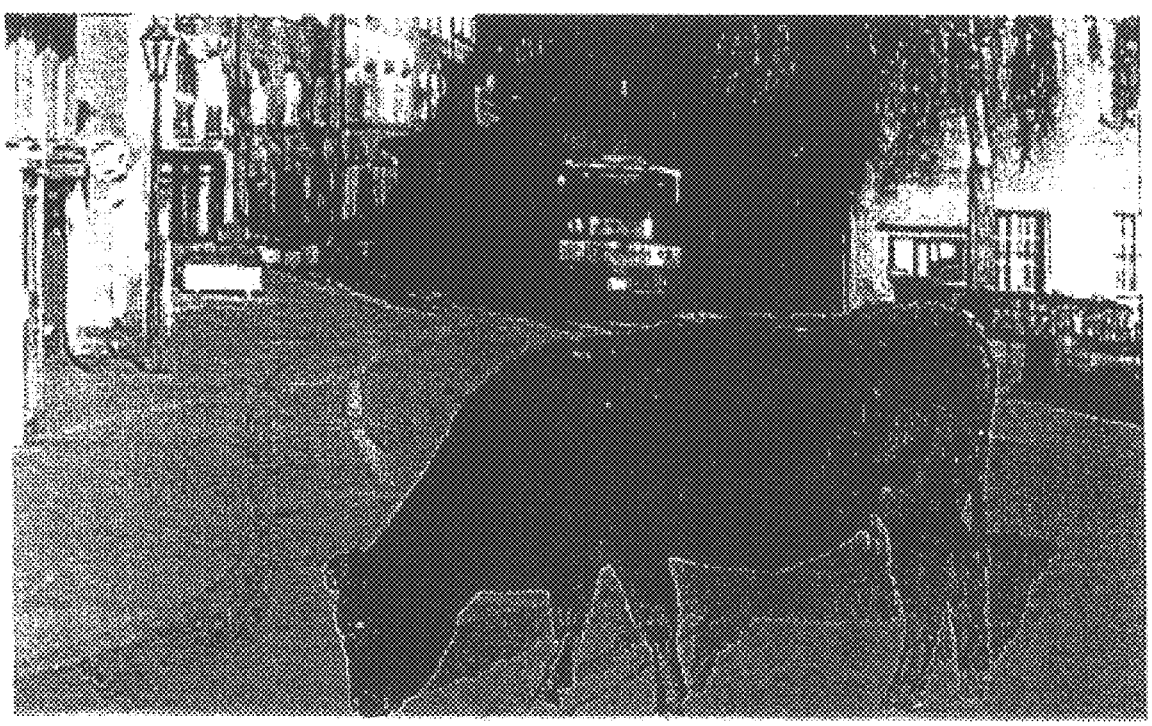
FIG. 15 is a view showing the result of image synthesis in the second embodiment.
Figure 28:
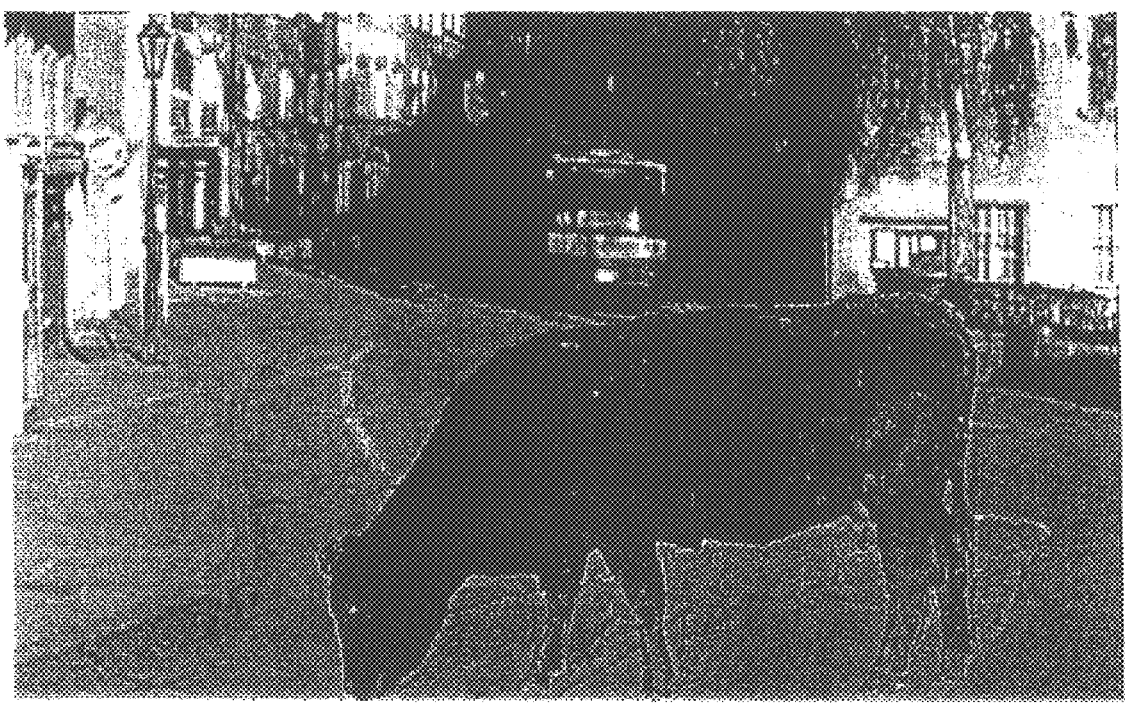
FIG. 28 is a view showing the result of conventional image synthesis.
Figure 29:
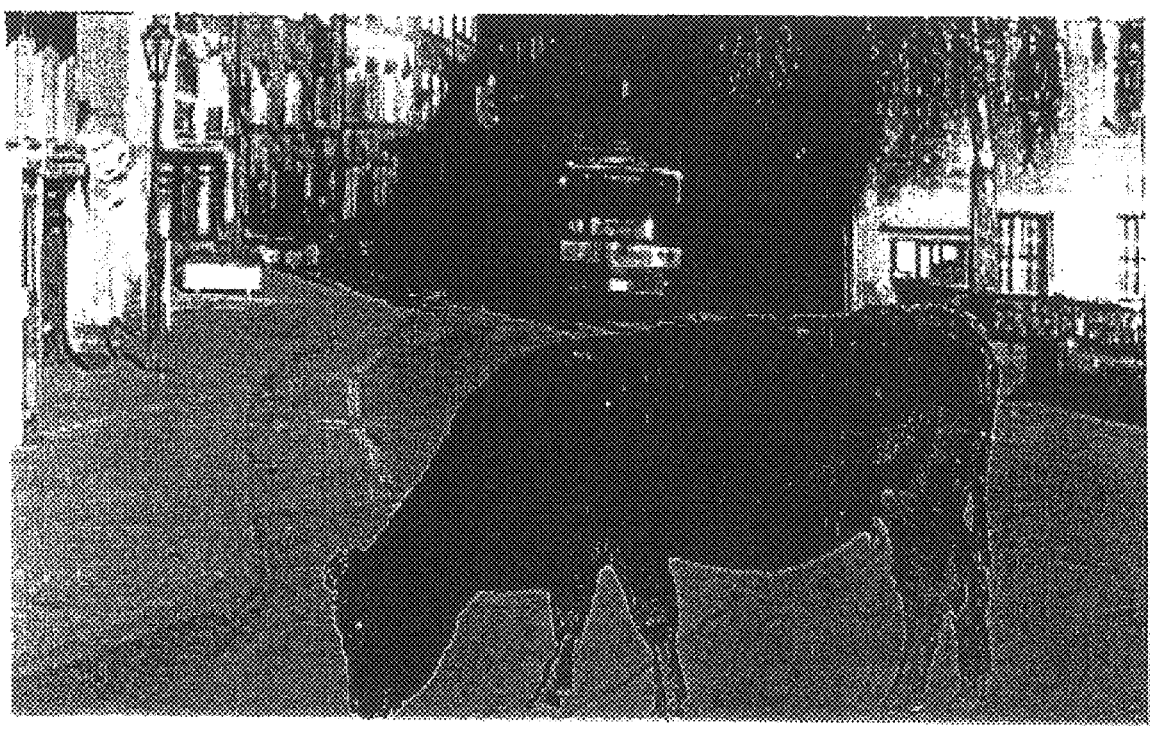
FIG. 29 is a view showing the result of conventional image synthesis.

FIG. 15 shows an image formed by reducing the cattle 1056 as an object and synthesizing the cattle together with the shade on the background image 1070 shown in FIG. 9. As shown in FIG. 15, an image of the asphalt road surface as the background is reflected on the shade of the cattle. Consequently, the artificialness is considerably suppressed compared to the image shown in FIG. 28 explained in "DESCRIPTION OF THE RELATED ART". That is, even the shade of the main object is naturally synthesized.

Referring back to FIG. 8, the encoder 216 encodes the synthesized image data by the MPEG-1 coding system and transmits the encoded data to the communication network 218 via the transmitter 217 or stores the data in a predetermined position of the storage device 219.

In the second embodiment as described above, a shade region is extracted from an object to be synthesized, and only a main object is encoded. Consequently, the number of pixels to be encoded can be reduced. Additionally, the extracted shade region is expressed as a shade object only by its shape and intensity and encoded. This allows a large reduction in information amount. Accordingly, the communication cost and the capacity of a storage medium can be reduced.

Furthermore, modification and adjustment of the intensity of shade are performed in accordance with the condition of an image to be synthesized. This allows easy generation of a synthetic image having no artificialness.

In the second embodiment, synthesis using no shade as in the first embodiment described above can also be performed by setting the shade intensity change parameter p to 0.

In the second embodiment, the shade encoder 205 encodes the shape of a shade object and a representative value of the intensity of the shade object. However, the present invention is not limited to this arrangement. For example, a difference value from a background image or transmittance when superposing a black pixel can also be used as the shade intensity. Alternatively, multi-value encoding for difference values can be performed.

The modification processes in the second embodiment are also not limited to those explained earlier, so some other modification processes can be performed. Additionally, in the second embodiment, the encoder 216 performs MPEG-1 by which an image is encoded in units of frames. However, individual objects can also be again encoded while being kept separated as in the MPEG-4 coding system.

Furthermore, processing one frame of a motion image is equivalent to processing a still image. Accordingly, the same effect as in the second embodiment can naturally be obtained for a still image by performing the same operation as in the second embodiment for the image.

Third Embodiment

The third embodiment of the present invention will be described below.

Figure 16:
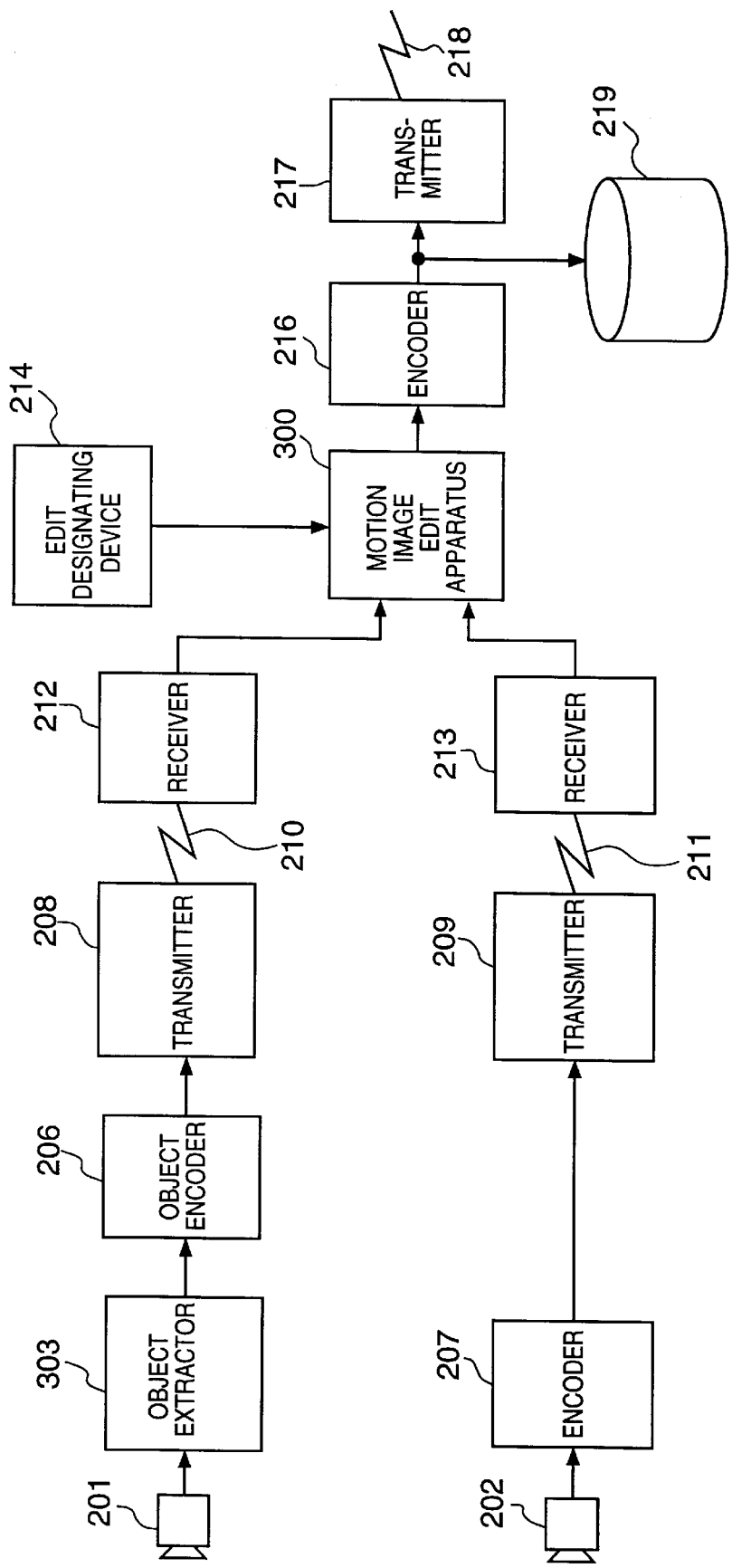
FIG. 16 is a block diagram showing the arrangement of a motion image edit system in the third embodiment according to the present invention.

FIG. 16 is a block diagram showing the arrangement of a motion image edit system according to the third embodiment. The same reference numerals as in the arrangement shown in FIG. 8 of the second embodiment denote the same parts in FIG. 16, and a detailed description thereof will be omitted. The arrangement shown in FIG. 16 is characterized in that a shade is neither extracted nor encoded when an image is transmitted from a TV camera 201.

In this arrangement, the TV camera 201 and a TV camera 202 sense motion images, and these images are encoded. As in the processes performed by the object extractor 203 and the shade extractor 204 in the second embodiment, an object extractor 303 extracts a main object from the input motion image from the TV camera 201. Assume that a cattle image 1056 is extracted from an image 1055 shown in FIG. 26 and a cattle object 1071 shown in FIG. 10 is obtained as the main object. The extracted cattle object 1071 is input to an object encoder 206 and encoded by the MPEG-4 coding system. In this MPEG-4 coding system, mask information representing the shape of the object and pixels values of the image are encoded. Meanwhile, an encoder 207 encodes the image data obtained by the TV camera 202 in accordance with the MPEG-1 coding system and transmits the encoded data to a communication channel 211 via a transmitter 209. This image data obtained by the TV camera 202 serves as a background image (a background image 1070 shown in FIG. 9) of a synthetic image.

Receivers 212 and 213 receive these encoded data and input the data to a motion image edit apparatus 300. The motion image edit apparatus 300 edits the motion images in accordance with designation input by a user from an edit designating device 214.

In the following description, assume that the position of the object to be synthesized in the background image 1070, the size of the object, and the intensity and direction of a shade are input to the motion image edit apparatus 300 as the edit designation by the user.

Figure 17:
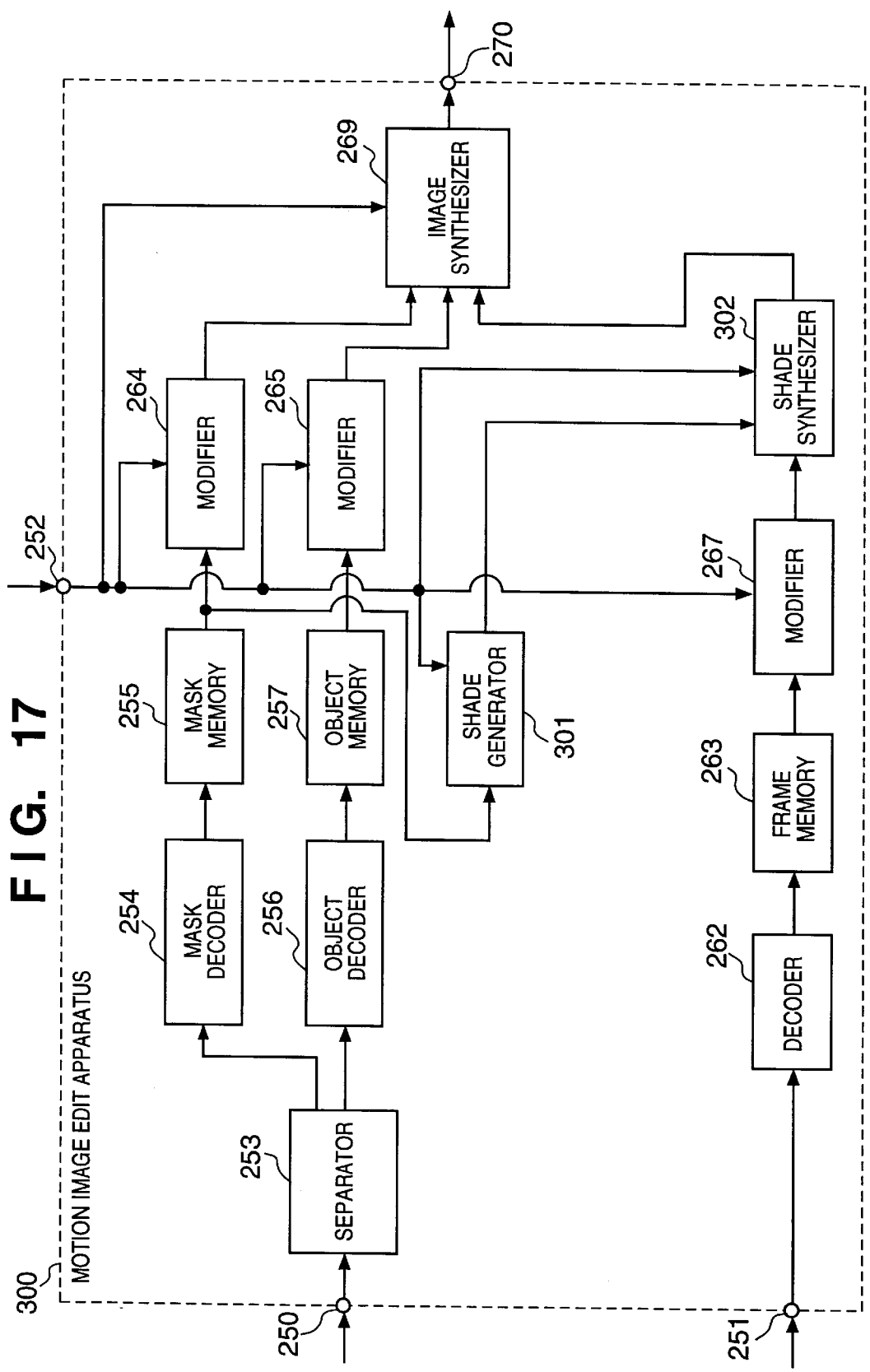
FIG. 17 is a block diagram showing the arrangement of a motion image edit apparatus in the third embodiment.

FIG. 17 is a block diagram showing the motion image edit apparatus 300. The same reference numerals as in FIG. 14 denote parts having the same functions in FIG. 17, and a detailed description thereof will be omitted. Referring to FIG. 17, a shade generator 301 generates a shade object as a secondary object from the mask information representing the shape of the cattle object 1071 as the main object. A shade synthesizer 302 synthesizes the generated shade object.

In the motion image edit apparatus 300 with the above arrangement, a terminal 250 inputs the encoded data received by the receiver 212 to a demultiplexer 253. The demultiplexer 253 demultiplexes the input encoded data by referring to the header or the like of each code and inputs the demultiplexed data to corresponding decoders in the succeeding stage. That is, the demultiplexer 253 inputs encoded data representing the shape of the object to a mask decoder 254 and encoded data of the pixel values of the object to an object decoder 256.

The mask decoder 254 decodes the mask data of the object to reconstruct the mask information and stores the information in a mask memory 255. The object decoder 256 decodes the encoded data of the image of the object to reconstruct the pixel values of the object and stores the pixel values in an object memory 257. A decoder 262 decodes the encoded data of the background image to reconstruct the pixel values of the background image and stores the pixel values in a frame memory 263.

The edit designating device 214 inputs parameters for modification processes, e.g., a magnification process of enlargement or reduction, rotation process, and affine transformation to modifiers 264, 265, and 267 and the shade generator 301. In the following description, assume that the object is to be reduced in accordance with the size of the background image. The modifiers 264 and 265 receive a reduction ratio as a parameter from the edit designating device 214. The modifier 264 reduces the contents of the mask memory 255 and outputs the result. The modifier 265 reduces the contents of the object memory 257 and outputs the result. The modifier 267 directly outputs the contents of the frame memory 263 holding the background image.

Figure 18:
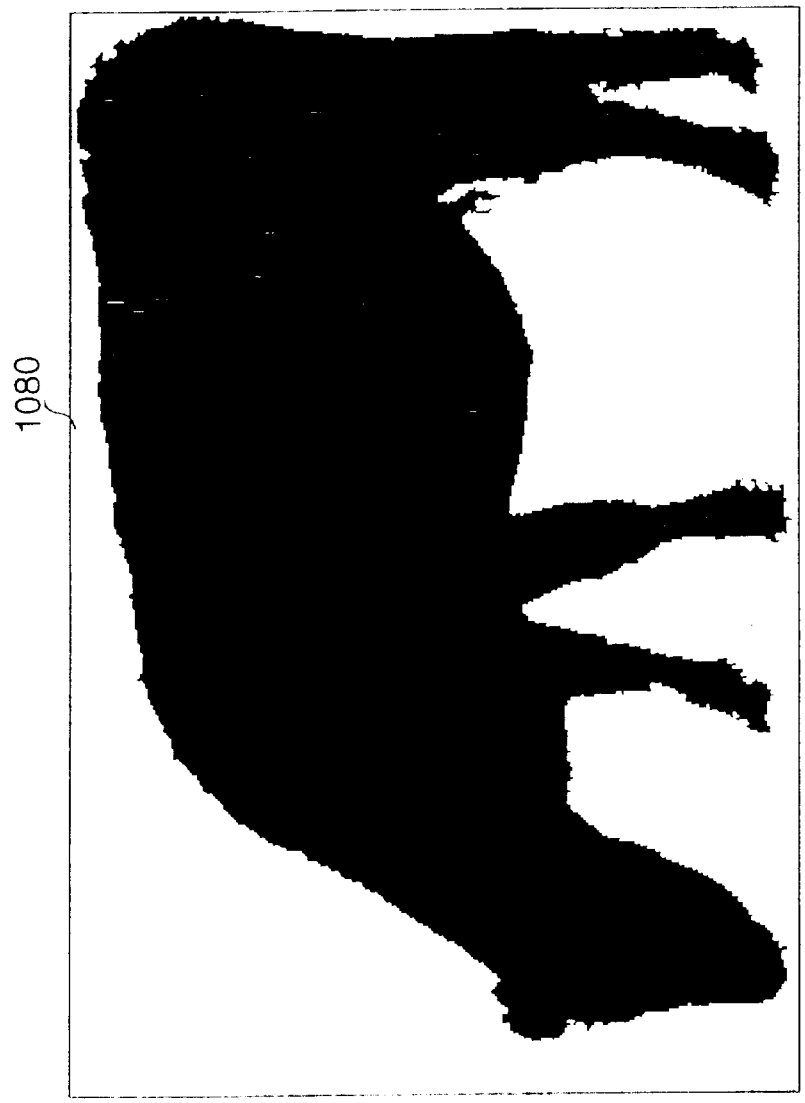
FIG. 18 is a view showing the basic shape of a shade object in the third embodiment.
Figure 19:
FIG. 19 is a view showing a modification of the basic shape of the shade object in the third embodiment.

The shade generator 301 reads out a binary image representing the shape information from the mask memory 255 and inverts the readout image to form a basic shape of the shade of the cattle object 1071. FIG. 18 shows a basic shape 1080 of the shade thus generated. For this basic shape 1080, the edit designating device 214 inputs a parameter for modifying the shade shape. This shape modification parameter is determined by adding the direction of light to the modification parameters given to the modifiers 264 and 265. FIG. 19 shows an example of the shade basic shape 1080 modified by these modification parameters.

A modification parameter can be readjusted after an image is actually synthesized. Also, a modification parameter once determined can be used in editing of another frame. When a plurality of objects are to be synthesized, a modification parameter of another object can be used. If another object has a shade object, a modification parameter can be readily obtained on the basis of the positional relationship between this object and its shade object. Furthermore, it is also possible to detect a shade existing in a background image and determine the most appropriate light direction in the background from a positional relationship with an object forming the shade.

In accordance with the shape of the shade image generated by the shade generator 301 and the shade intensity and the synthesis position of the shade output from the edit designating device 214, the shade synthesizer 302 synthesizes this shade image on the modification result of the background image. The shade synthesizer 302 inputs this background image synthesized with the shade to an image compositor 269.

Figure 20:
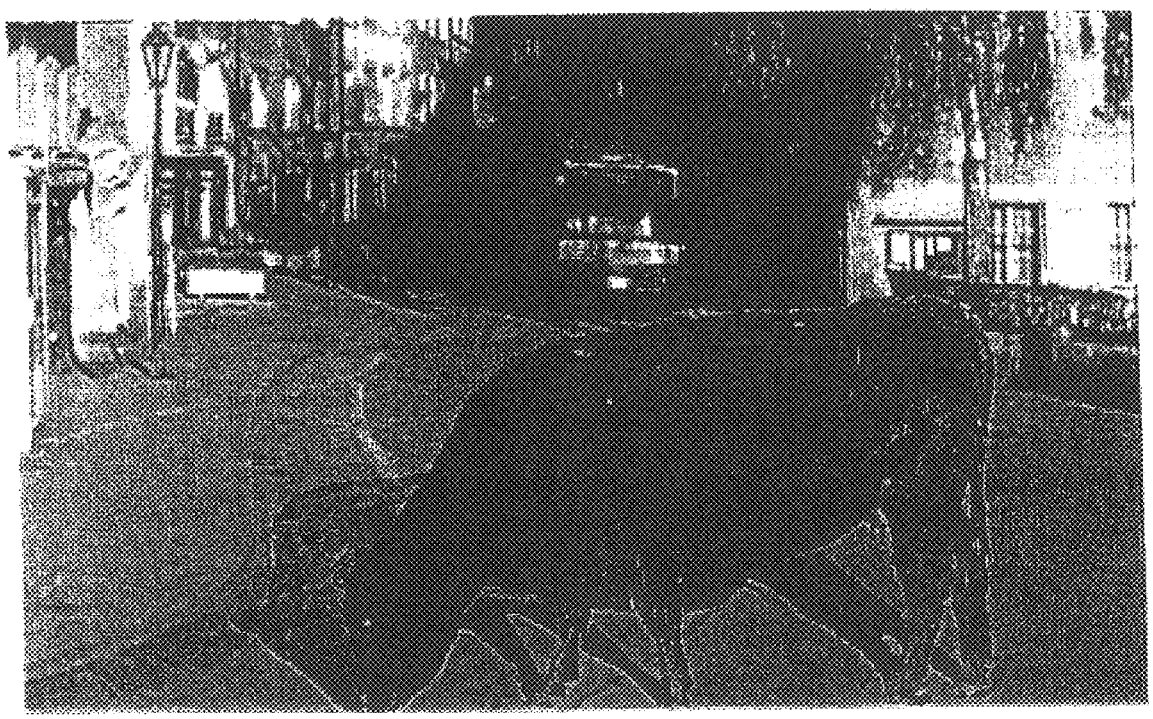
FIG. 20 is a view showing the result of image synthesis in the third embodiment.

In accordance with the synthesis position of the main object input from the edit designating device 214 and the modification result of the mask data of the main object held in the mask memory 255, the image compositor 269 replaces the pixel value of the background image with the pixel value of the main object for a pixel where the main object is to be synthesized. A terminal 270 outputs the result of synthesis to an encoder 216 shown in FIG. 16. FIG. 20 shows an image formed by synthesizing the cattle object 1056 on the background image 1070 shown in FIG. 9 by reducing the cattle image 1056 and adding the shade to the cattle image 1056. As is readily understood by comparing this image with the image shown in FIG. 15 in the second embodiment, the direction of a shade can be freely changed in the third embodiment.

Referring back to FIG. 16, the encoder 216 encodes the synthetic image data by the MPEG-1 coding system and transmits the encoded data to a communication network 218 via a transmitter 217 or stores the data in a predetermined position of a storage device 219.

In the third embodiment as described above, a shade as a secondary object is generated and added in an arbitrary direction on the basis of shape information of a main object to be synthesized. Accordingly, artificialness in a synthetic image can be easily suppressed by, e.g., matching the direction of the shade of a main object with the direction of a shade existing in a background.

The modification processes in the third embodiment are not limited to those explained before either, so some other modification processes can be performed. Additionally, in the third embodiment, the encoder 216 performs MPEG-1 by which an image is encoded in units of frames. However, individual objects can also be again encoded while being kept separated as in the MPEG-4 coding system.

Also, in the third embodiment, an image formed by synthesizing a shade with a main object is encoded by the MPEG-1 coding system. A secondary object as this shade can be encoded by using the shape and the shade intensity or in accordance with the MPEG-4 coding system.

Furthermore, processing one frame of a motion image is equivalent to processing a still image. Accordingly, the same effect as in the third embodiment can naturally be obtained for a still image by performing the same operation as in the third embodiment for the image.

Fourth Embodiment

The fourth embodiment of the present invention will be described below. This fourth embodiment is characterized in that a plurality of objects in a motion image are divisionally extracted and the interframe correlation between these objects is detected.

Figure 30:
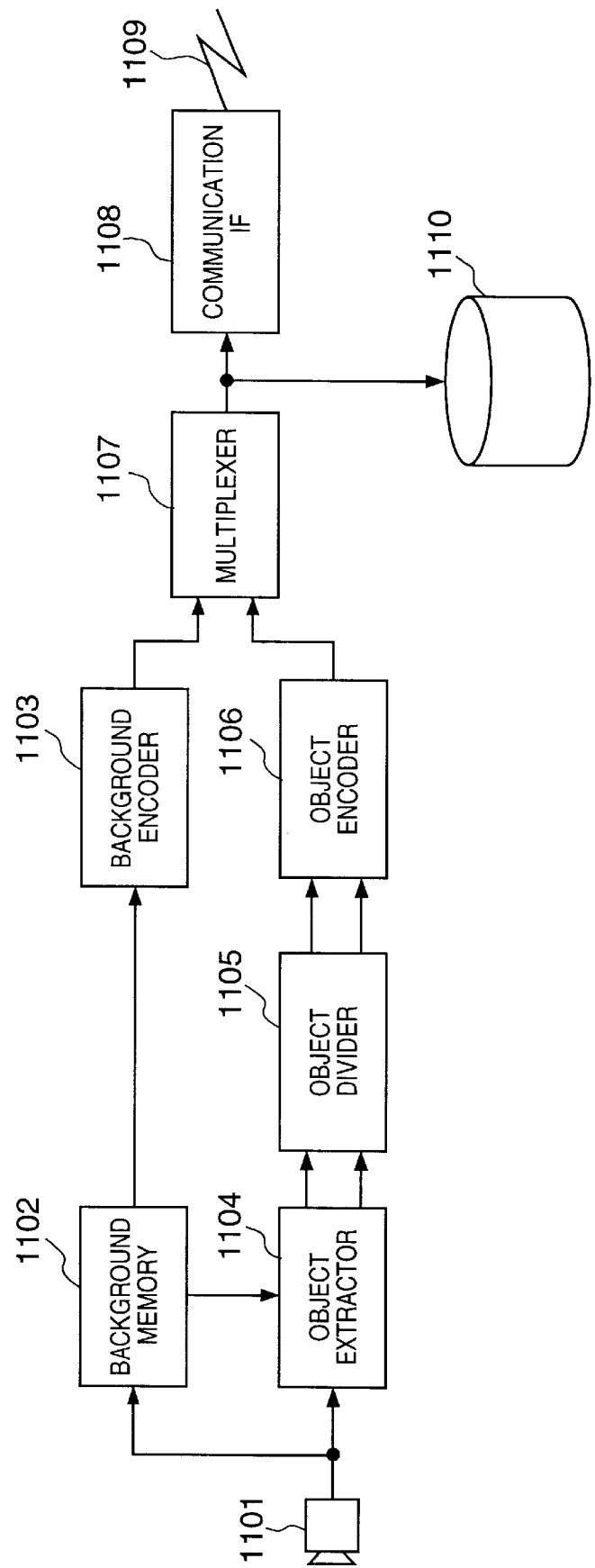
FIG. 30 is a block diagram showing the arrangement of a motion image input apparatus in the fourth embodiment according to the present invention.

FIG. 30 is a block diagram showing the arrangement of a motion image input apparatus as the fourth embodiment. In this embodiment, "Morphological Segmentation Using Advance Knowledge Information in Sports Programs" described earlier is used as a method of extracting objects from an image, and the MPEG-4 coding system is used as a coding system.

Referring to FIG. 30, a TV camera 1101 can be any camera, provided that the camera senses a motion image and outputs it as a digital signal. A background memory 1102 stores a background image previously sensed. A background encoder 1103 encodes the background image. An object extractor 1104 extracts objects by the aforementioned morphological segmentation. An object divider 1105 for dividing the objects is the characteristic feature of this embodiment. An object encoder 1106 encodes the divided objects. A multiplexer 1107 adds headers and the like to the obtained encoded data and thereby synthesizes encoded data suitable for the coding format of MPEG-4. Reference numerals 1108 and 1109 denote a communication interface and a communication channel, respectively. A storage device 1110 stores the encoded data.

Figure 48:
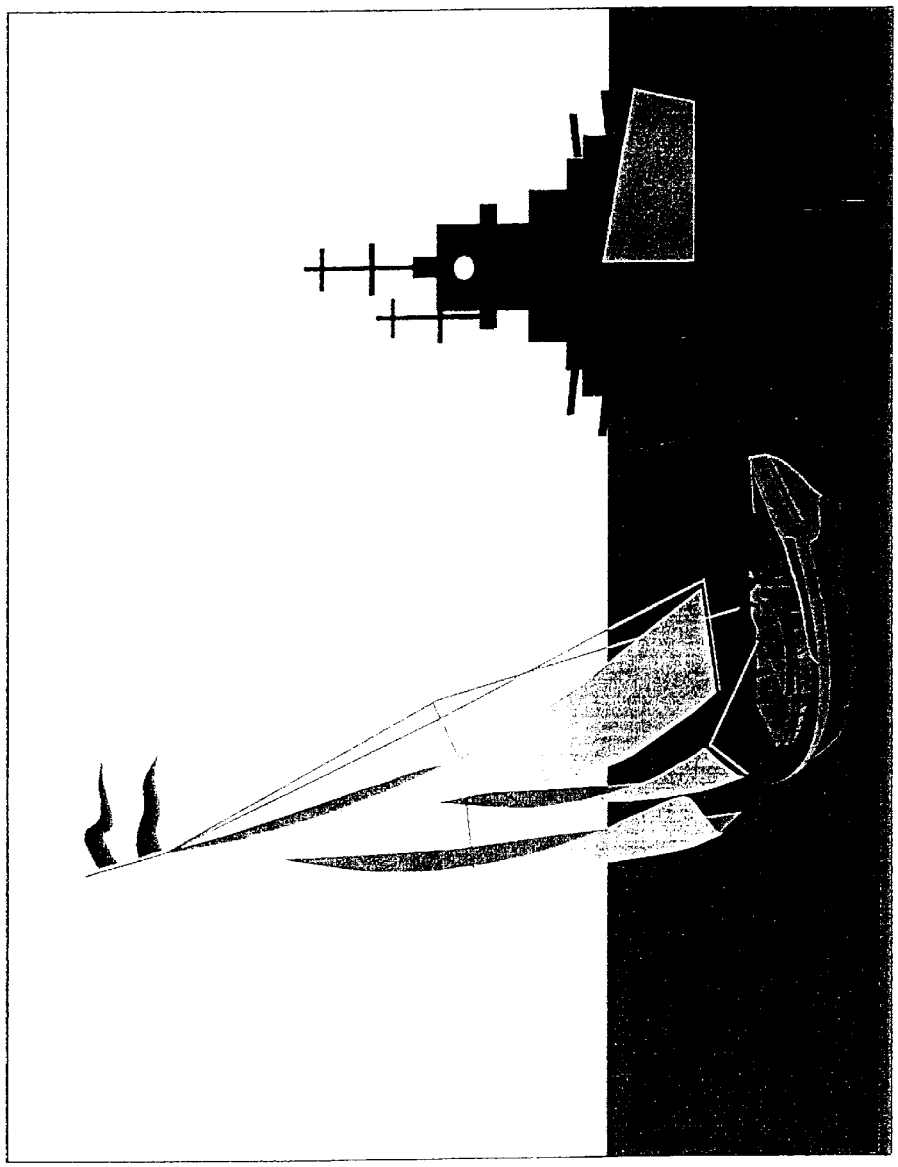
FIG. 48 is a view showing the contents of one frame of a motion image as an example.

A process of sensing a motion image, encoding the image, and outputting the encoded data in the fourth embodiment will be described in detail below. To simplify the explanation, image sensing of a yacht and a battle ship shown in FIG. 48 will be described as an example.

Figure 49:
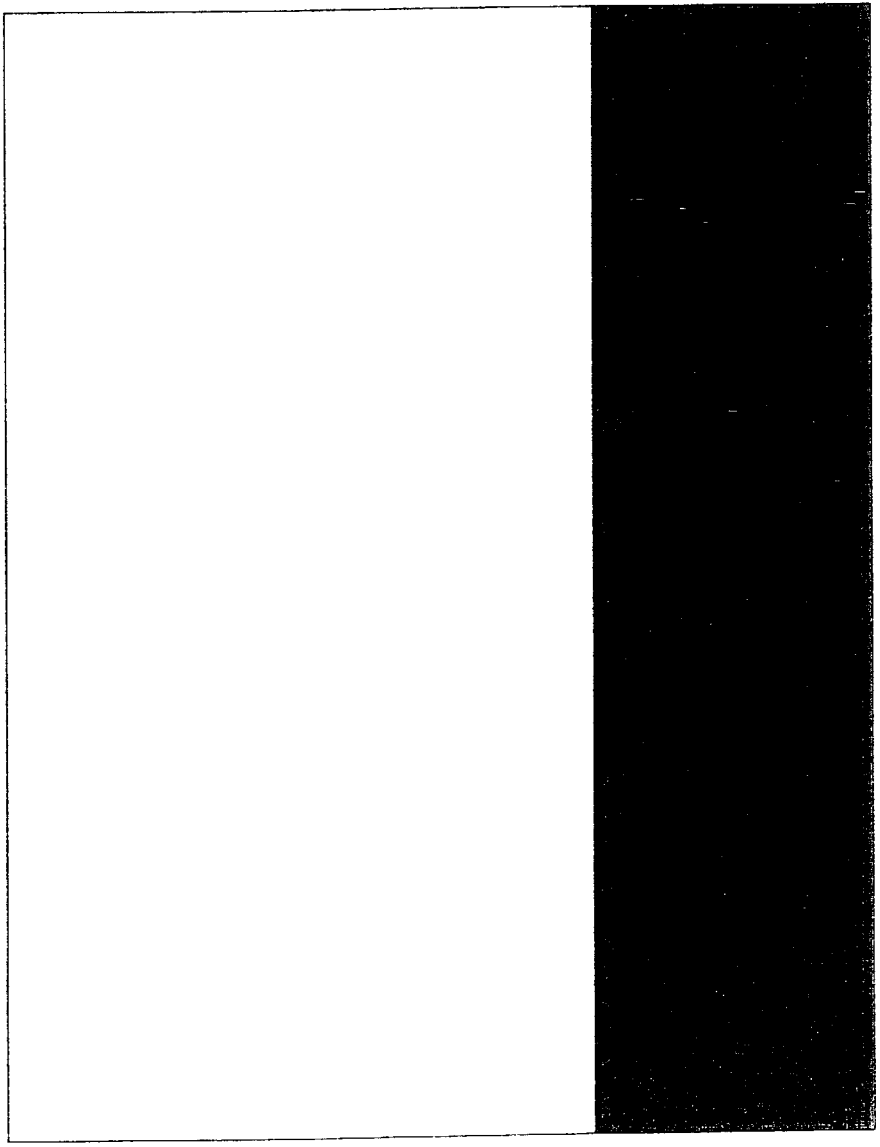
FIG. 49 is a view showing an example of a background image.

In the arrangement shown in FIG. 30, a user first initializes the individual components to allow the TV camera 1101 to sense an image having no objects, i.e., a background image. The sensed image, e.g., a background image shown in FIG. 49 is input to the background memory 1102. The background encoder 1103 encodes the contents of the background memory 1102. The multiplexer 1107 adjusts the encoded data into the form of MPEG-4 encoded data and transmits the data to the communication channel 1109 via the communication interface 1108 or stores the data in the storage device 1110.

Subsequently, the TV camera 1101 senses a motion image (FIG. 48) containing objects and inputs the sensed image to the object extractor 1104. The object extractor 1104 extracts regions having different characteristics from those of the background image as objects by using the morphological segmentation, and inputs shape information and image data of the extracted regions to the object divider 1105.

Figure 31:
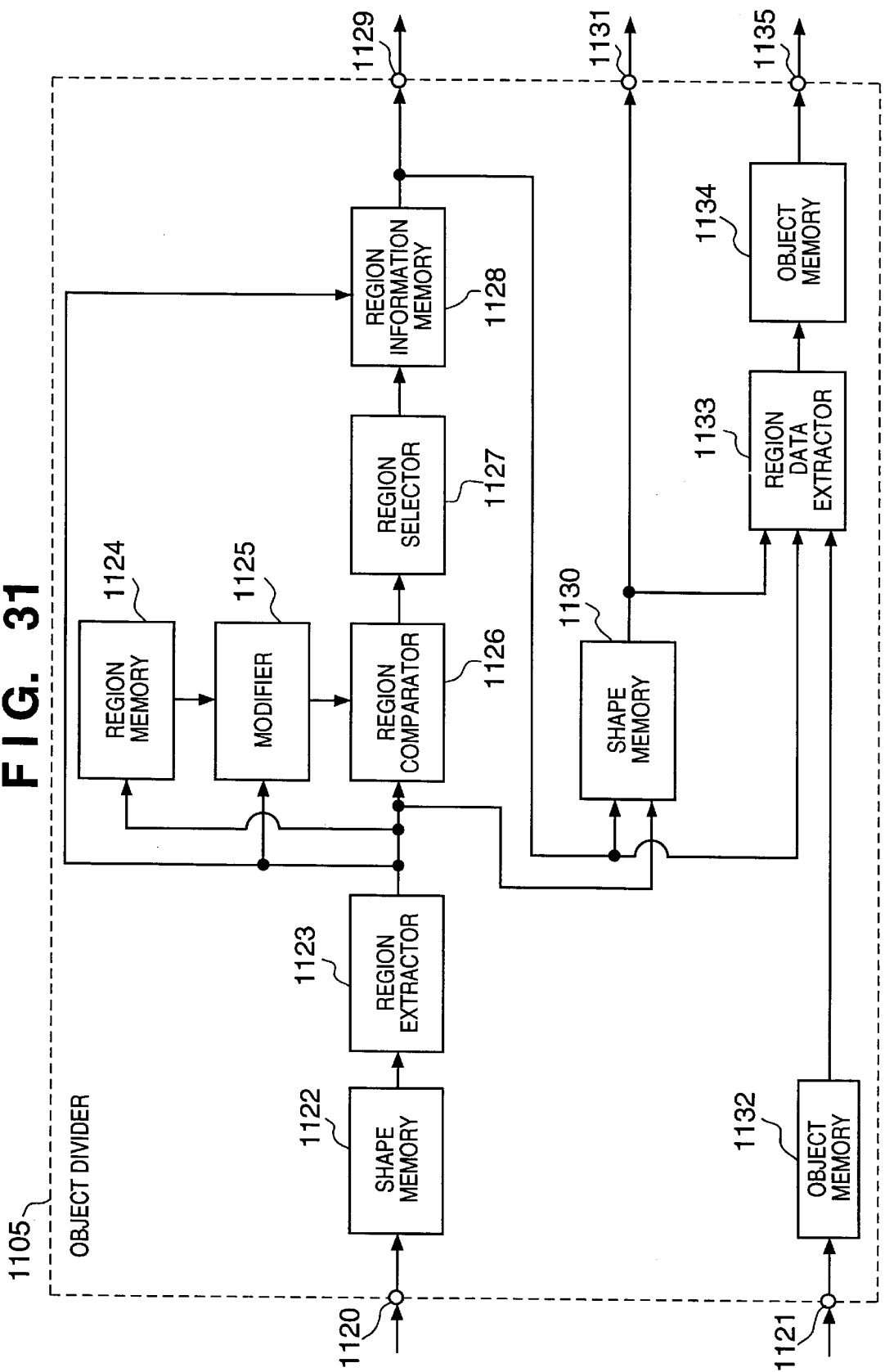
FIG. 31 is a block diagram showing details of the arrangement of an object divider in the fourth embodiment.

FIG. 31 is a detailed block diagram showing the arrangement of the object divider 1105. Referring to FIG. 31, a terminal 1120 inputs a binary image as the shape information from the object extractor 1104. A terminal 1121 inputs the object image data from the object extractor 1104. A shape memory 1122 stores the input shape information in units of frames. An object memory 1132 stores the input object image data in units of frames. A region extractor 1123 extracts closed regions from the shape information by cutting out the regions into the form of rectangles. A region memory 1124 stores the extracted regions. A modifier 1125 modifies the data by magnifying it. A region comparator 1126 calculates exclusive OR of the output data of each region from the region extractor 1123 and an output from the modifier 1125, thereby comparing the regions. A region selector 1127 selects the most similar region on the basis of the region comparison result. A region information memory 1128 stores information of the extracted regions. A terminal 1129 outputs the information of the extracted regions. A shape memory 1130 stores each region as new shape information in accordance with the region information. A terminal 1131 outputs the shape information of each region stored in the shape memory 1130. A region data extractor 1133 reads out the image data from the object memory 1132 and checks a specific closed region to which the image data belongs, in accordance with the region information in the region information memory 1128 and the shape information in the shape memory 1130. The region data extractor 1133 stores the image data of each closed region in an object memory 1134.

Figure 32:
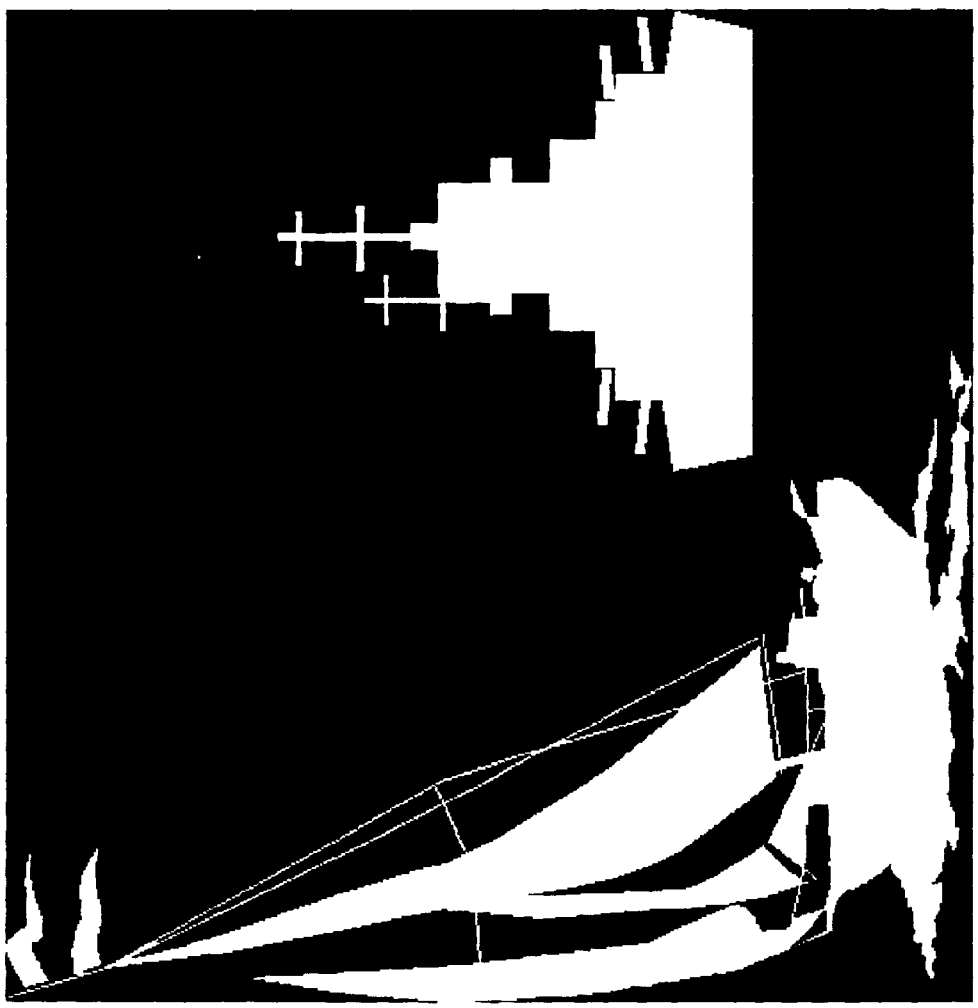
FIG. 32 is a view showing an example of an object region in the fourth embodiment.
Figure 33:
FIG. 33 is a view showing an example of an object region in the fourth embodiment.
Figure 50:
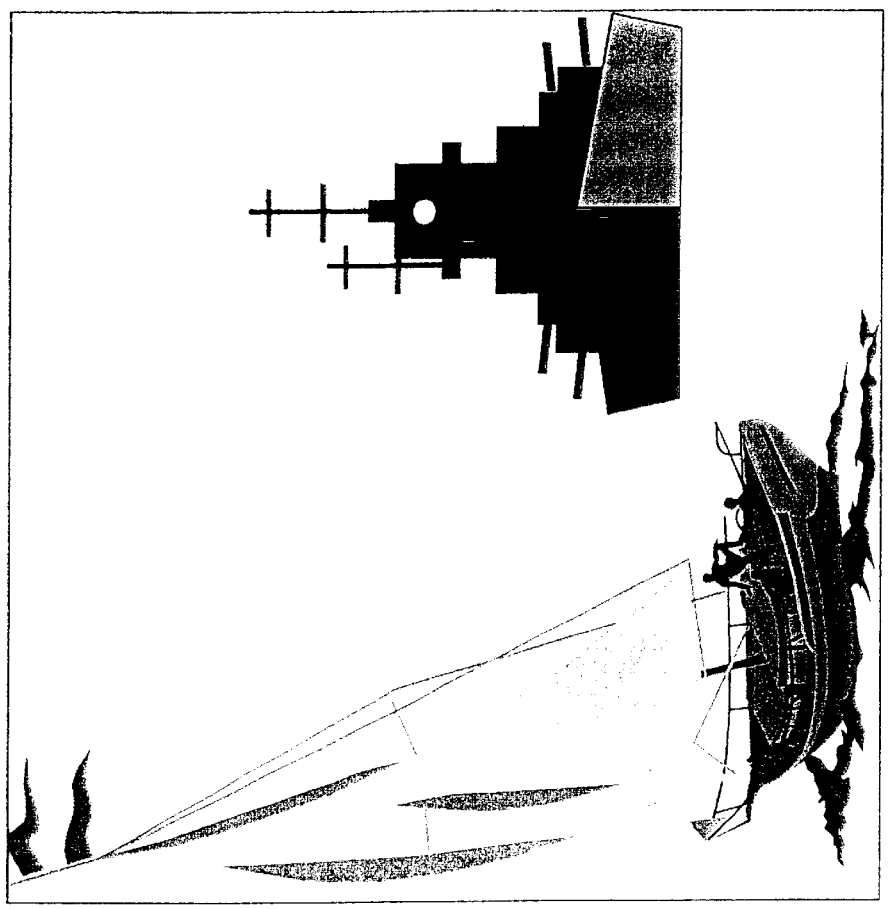
FIG. 50 is a view showing examples of extracted objects.

In this arrangement, the terminals 1120 and 1121 input shape information (FIG. 32) and object image data (FIG. 50), respectively, of a first frame containing objects. The shape memory 1122 and the object memory 1132 store these shape information and object image data, respectively. The region extractor 1123 reads out a binary image from the shape memory 1122 and extracts closed regions contained in the shape information. FIG. 32 shows that the information contains two closed regions; one is a yacht and the other is a battle ship. The region extractor 1123 first cuts out the left closed region (yacht) into a circumscribed rectangle as shown in FIG. 33 and stores it into the region memory 1124 and the shape memory 1130. When a frame to be processed is the first frame, neither the region comparator 1126 nor the region selector 1127 operate. Therefore, the region information memory 1128 regards the extracted closed region as new shape information and stores information such as the position and size of the region. Similarly, the region extractor 1123 continuously cuts out the right closed region (battle ship) into a circumscribed rectangle as shown in FIG. 34 and stores it into the region memory 1124, the shape memory 1130, and the region information memory 1128.

After that, the region data extractor 1133 reads out the image data from the object memory 1132 and checks a specific closed region to which the image data belongs, in accordance with the region information in the region information memory 1128 and the shape information in the shape memory 1130. The region data extractor 1133 stores the image data of each closed region in the object memory 1134. In the fourth embodiment, the image data stored in the object memory 1134 are new divided objects.

The foregoing is the dividing process for one frame by the object divider 1105. Data is input to the object divider 1105 in the order of frames to be encoded. Assuming that the succeeding frame has an image shown in FIG. 53, processing for the second and subsequent frames by the object divider 1105 will be described below.

Figure 35:
FIG. 35 is a view showing an example of an object region in the fourth embodiment.
Figure 53:
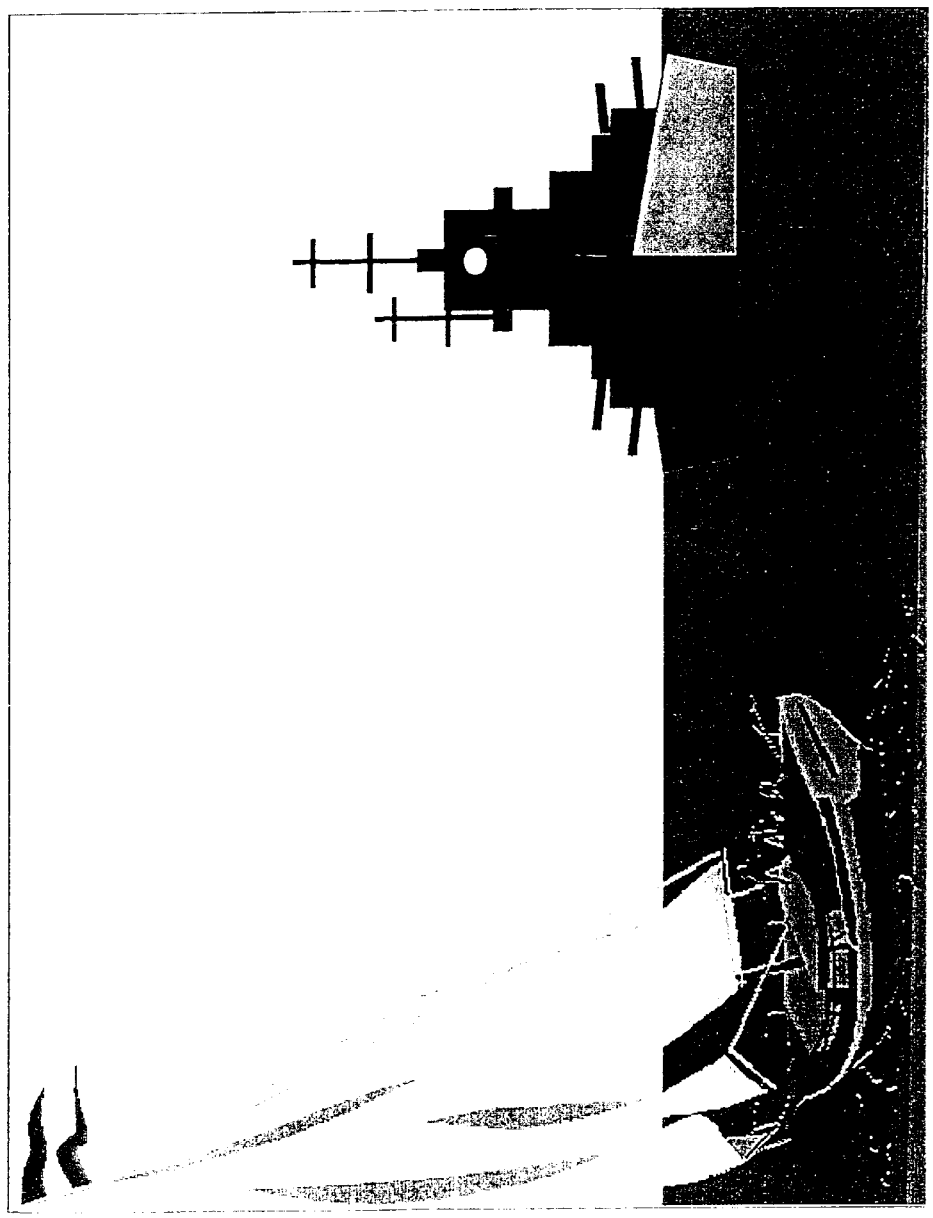
FIG. 53 is a view showing the contents of one frame of a motion image as an example.

Comparison of FIG. 53 with FIG. 49 shows that the yacht is steered to the left in the frame and the battle ship is moving toward a viewer. Frame shape information and object image data are input from the terminals 1120 and 1121 of the object divider 1105 and stored in the shape memory 1122 and the object memory 1132, respectively. As in the case of the first frame, the region extractor 1123 reads out a binary image from the shape memory 1122 and extracts closed regions contained in the shape information. The extracted closed region of the yacht is first processed. FIG. 35 shows this extracted region. The modifier 1125 reads out each of the regions already stored in the region memory 1124 and magnifies each readout region such that the region has the same size as the input shape information (equivalent to FIG. 35) to the region comparator 1126.

Figure 36:
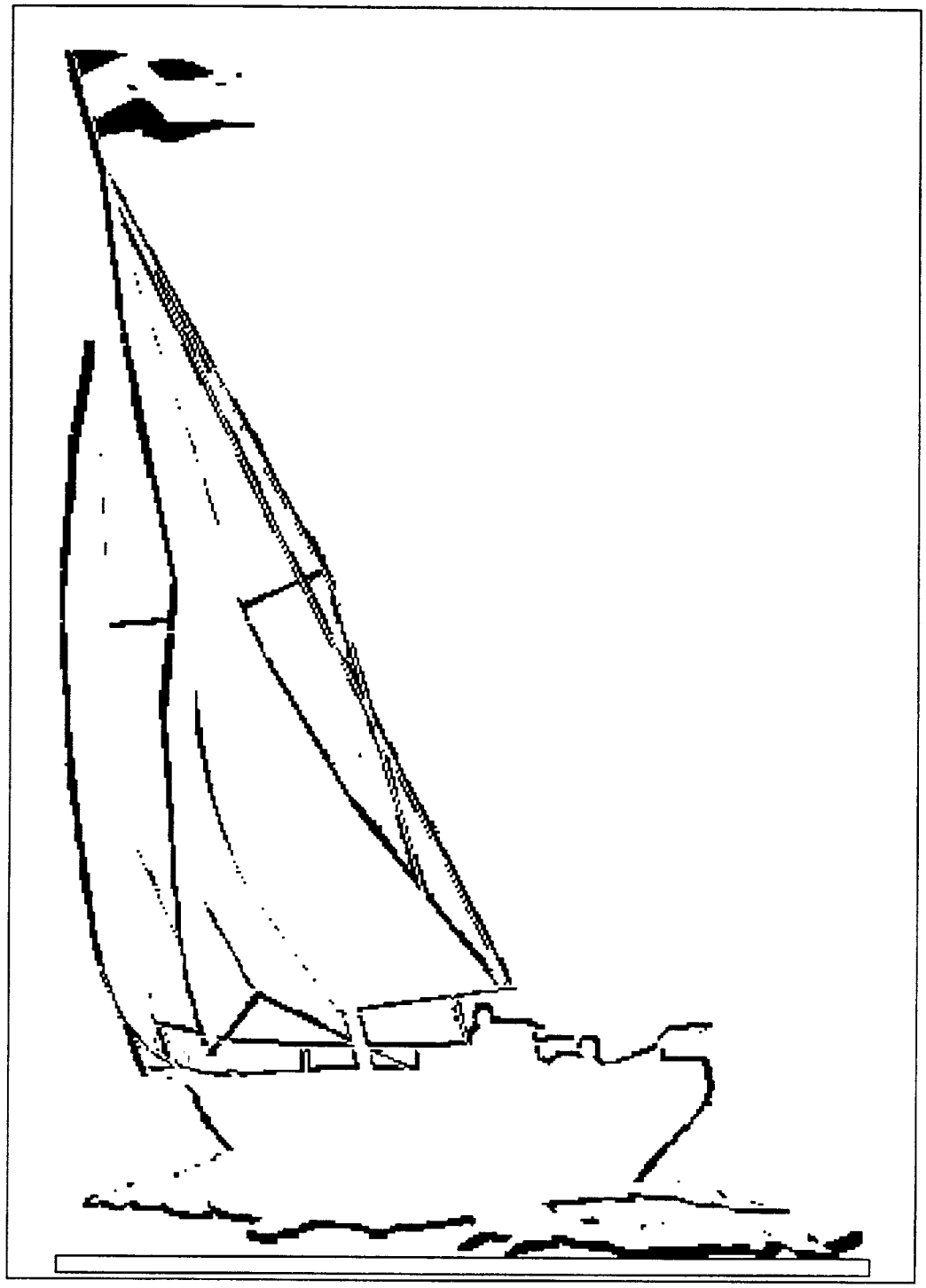
FIG. 36 is a view for explaining a shape information difference in the fourth embodiment.

The region comparator 1126 compares the magnified region with the input region by calculating the difference between the two regions. FIG. 36 shows a result obtained by modifying the shape information of the yacht in the preceding frame and calculating exclusive OR of this modified information and a newly input closed region image. FIG. 37 shows a result obtained by modifying the shape information of the battle ship in the preceding frame and calculating exclusive OR. In FIGS. 36 and 37, black pixels represent pixels which vary from one region to the other. The number of these black pixels is larger in FIG. 37. That is, the region comparator 1126 counts black pixels and regards a closed region with a smaller count as having a higher similarity to the input region.

The region comparator 1126 inputs this count to the region selector 1127. On the basis of the count from the region comparator 1126, the region selector 1127 detects that the input closed region from the terminal 1120 represents the same object as the closed region of the yacht detected in the preceding frame. Accordingly, the region selector 1127 writes information indicating that the newly detected closed region is the yacht object and also writes region information such as the position and size of this closed region into the region information memory 1128.

Subsequently, the region comparator 1126 calculates exclusive OR of the battle ship region on the right side in FIG. 53 and each of the closed regions. On the basis of the result of this comparison, the region information memory 1128 stores information indicating that the newly detected closed region is the battle ship object and also stores region information such as the position and size of the closed region into the region information memory 1128. The object encoder 1106 shown in FIG. 30 assigns codes to the contents of the region information memory 1128 as object information when encoding is performed. The multiplexer 1107 records this object information in a header or the like.

Figure 38:
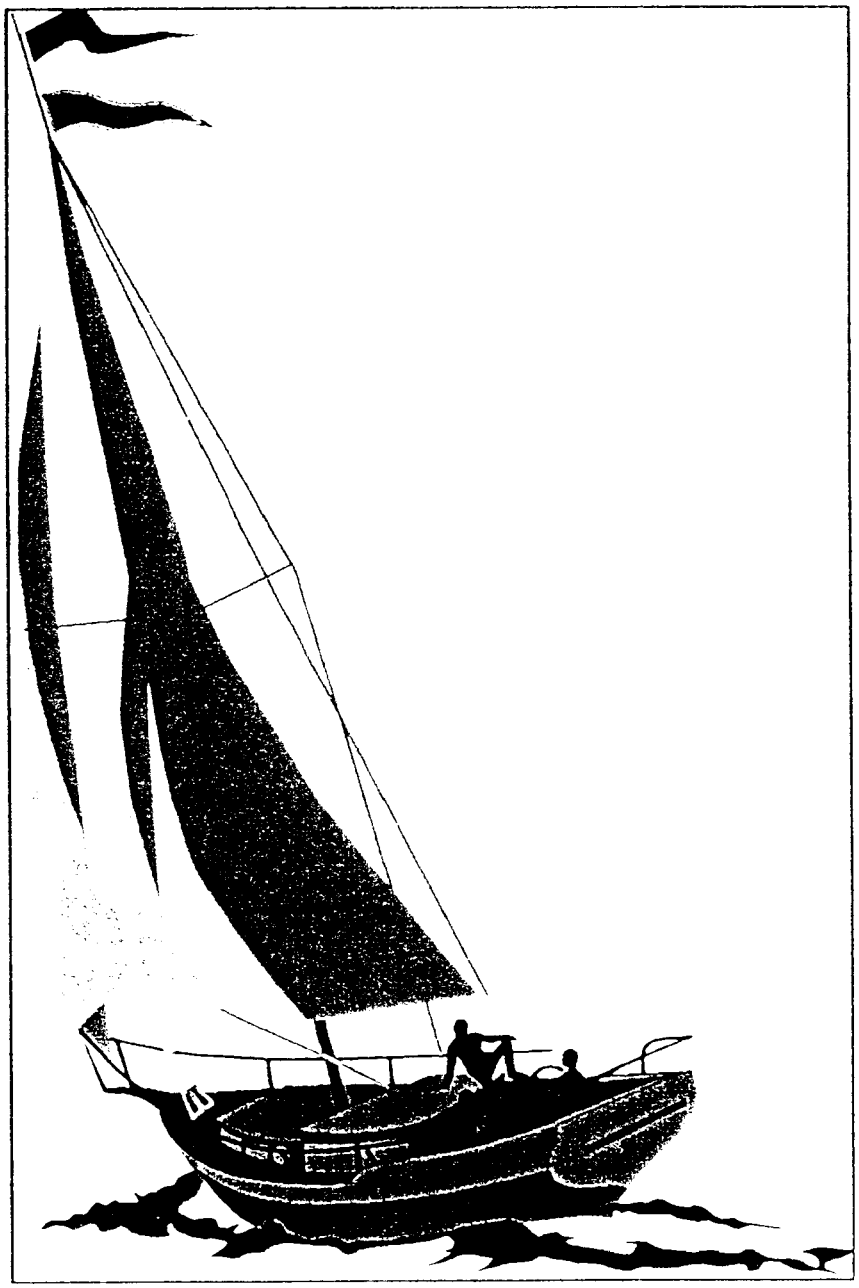
FIG. 38 is a view for explaining division of an object in the fourth embodiment.
Figure 39:
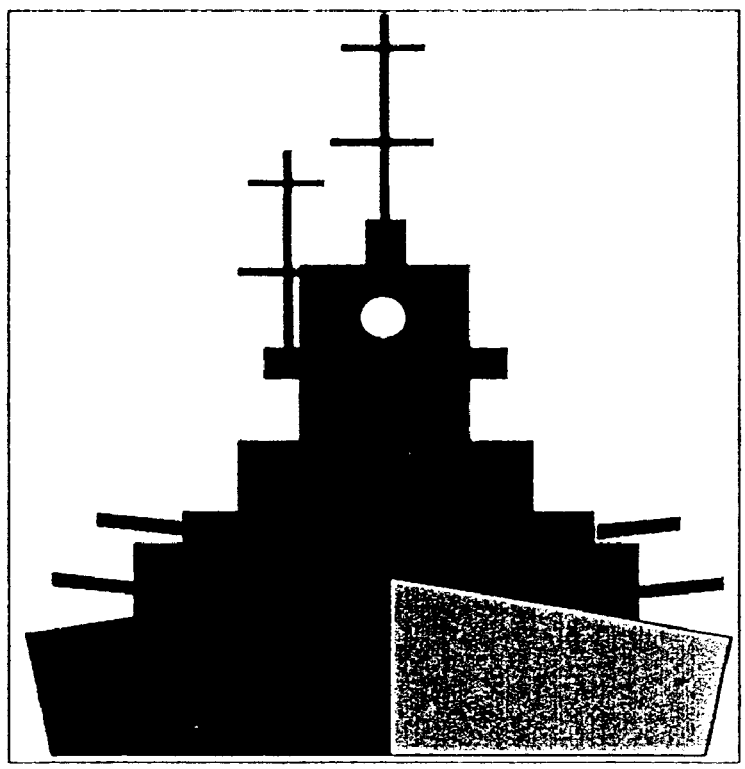
FIG. 39 is a view for explaining division of an object in the fourth embodiment.

The two closed regions detected as above are stored in the shape memory 1130. On the basis of the contents of the region information memory 1128 and the contents of the shape memory 1130, the region data extractor 1133 cuts out the two object data from the object memory 1132 and separately stores the data in the object memory 1134. FIG. 38 shows the cut data of the yacht, and FIG. 39 shows the cut data of the battle ship. When encoding is performed, the contents of the shape memory 1130 and the contents of the object memory 1134 are read out from the terminals 1131 and 1135, respectively.

After dividing the two closed region, the contents of the region memory 1124 is updated by the closed region extracted by the region extractor 1123.

The foregoing is the explanation of the dividing process by the object divider 1105.

Figure 51:
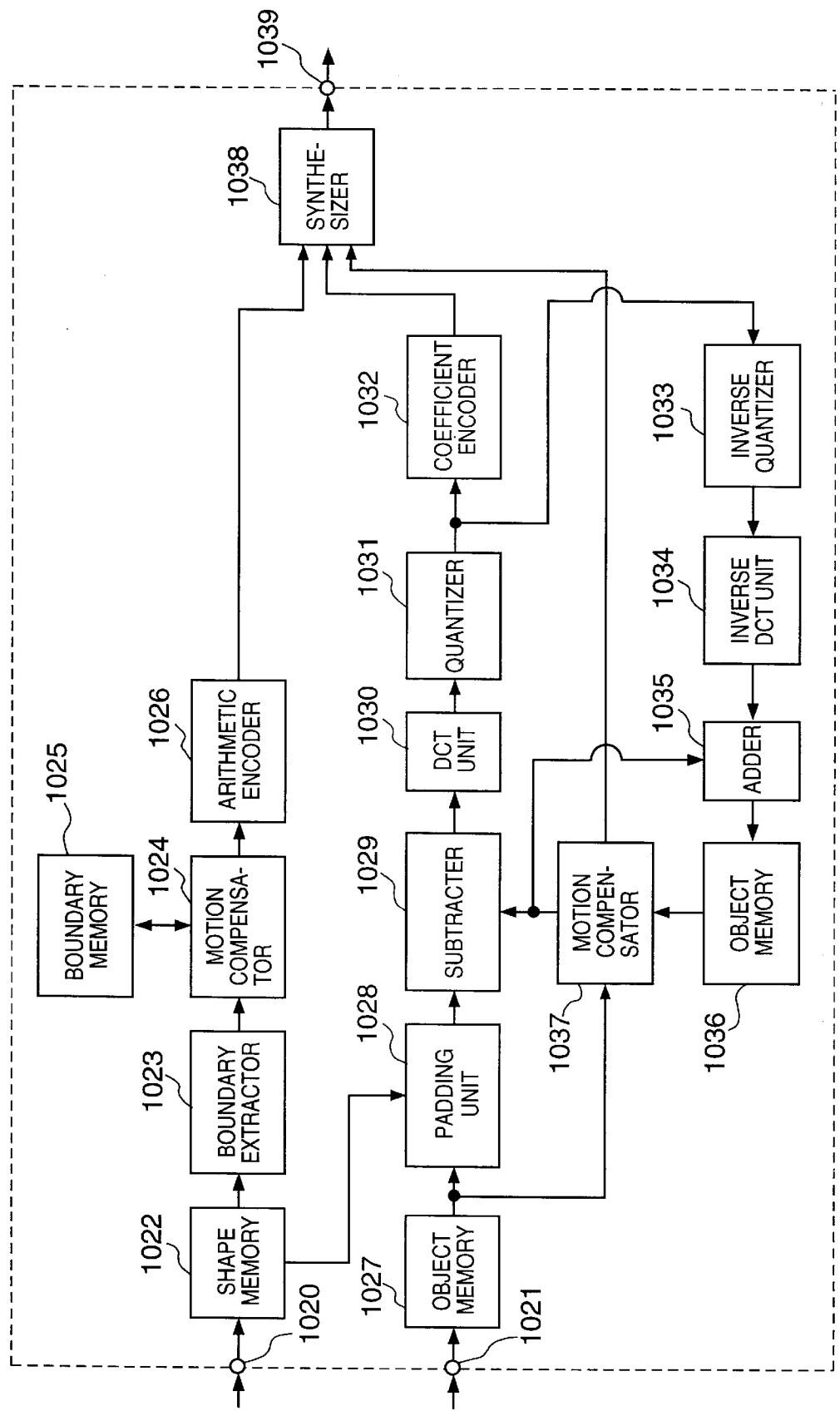
FIG. 51 is a block diagram for explaining the MPEG-4 coding system.
Figure 52:
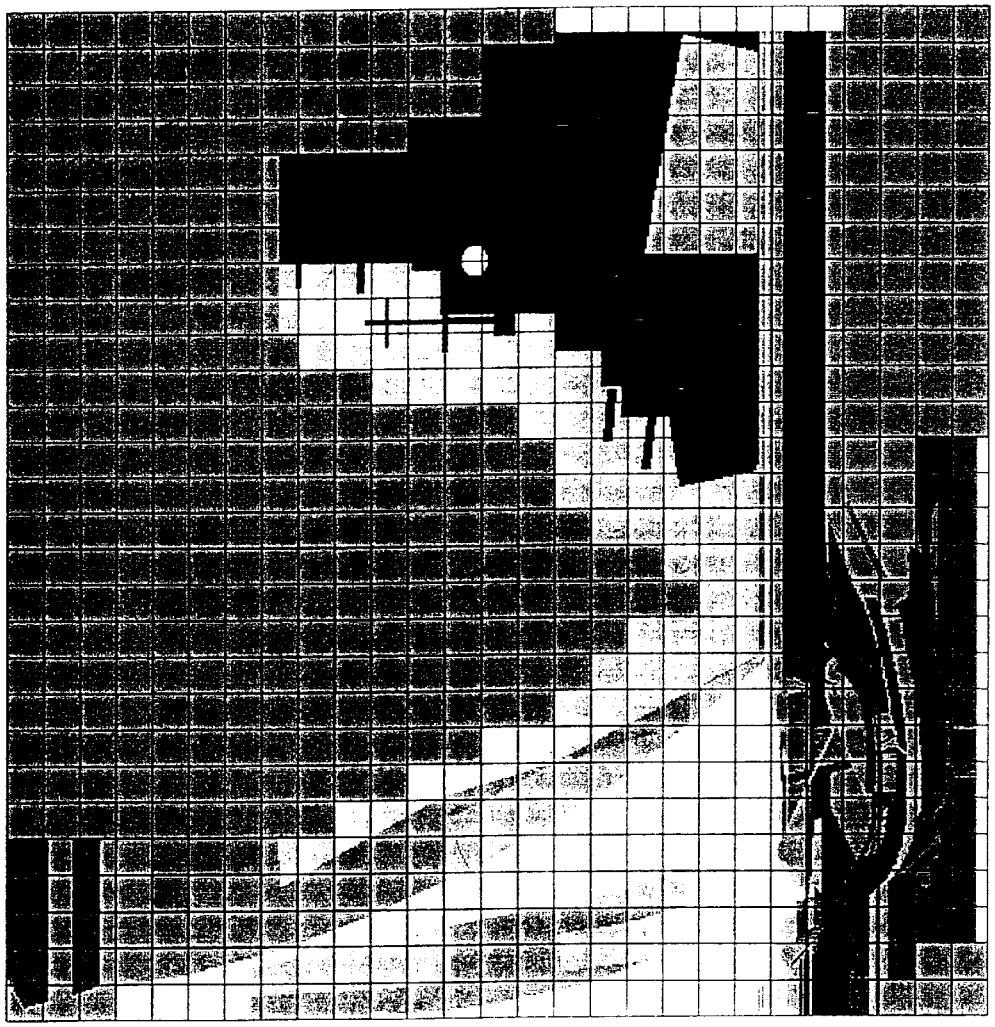
FIG. 52 is a view showing padding of objects in the prior art.

Referring back to FIG. 30, the object encoder 1106 encodes the contents of the region information memory 1128, the shape memory 1130, and the object memory 1134, which are output from the object divider 1105, in accordance with the format of the MPEG-4 coding system, and outputs the encoded data to the multiplexer 1107. The shape and object image data can be encoded by the aforementioned arrangement shown in the block diagram of FIG. 51. The multiplexer 1107 synthesizes outputs from the background encoder 1103 and the object encoder 1106 and adjusts the synthetic data into the form of MPEG-4 encoded data by adding a header and the like. After that, the multiplexer 1107 transmits the encoded data to the communication channel 1109 via the communication interface 1108 or stores the data in the storage device 1110.

In the fourth embodiment as described above, objects are divided on the basis of shape information by a series of selecting operations, and the similarity of each object is measured for each frame. This allows easy determination of continuous objects. Since an interframe correlation is obtained by this processing, the coding efficiency can be improved. Additionally, it is possible to separately edit objects and process them as different encoded data.

Also, the size of one object can be minimized on encoding and decoding sides. Therefore, a processing amount can be reduced by reducing a region to be compensated for. At the same time, a memory capacity for decoding objects can be decreased on the decoding side.

In the fourth embodiment, the number of mismatching pixels in shape information is referred to to measure the similarity of a region. However, the present invention is not particularly limited to this embodiment. For example, the barycenter of a shape or the shape itself can also be used. As a method of comparing shapes, features such as the way a contour bends or branches by contour tracking can be used in determination.

The coding system is also not limited to the MPEG-4 coding system. For example, another coding system such as chain coding can be used to encode a shape. Also, encoding using no interframe correlation can be used as encoding of object image data.

Furthermore, a method of outputting the obtained encoded data is not limited to that of this embodiment. In addition, after objects are divided, it is also possible to directly input the objects to, e.g., an apparatus for editing an image without encoding it, thereby changing the layout of the objects or performing image editing, e.g., rotating and/or enlarging or reducing each object.

Fifth Embodiment

The fifth embodiment according to the present invention will be described below. The characteristic feature of this fifth embodiment is that a case in which image data to be processed is input as encoded data in the abovementioned fourth embodiment is taken into consideration.

Figure 40:
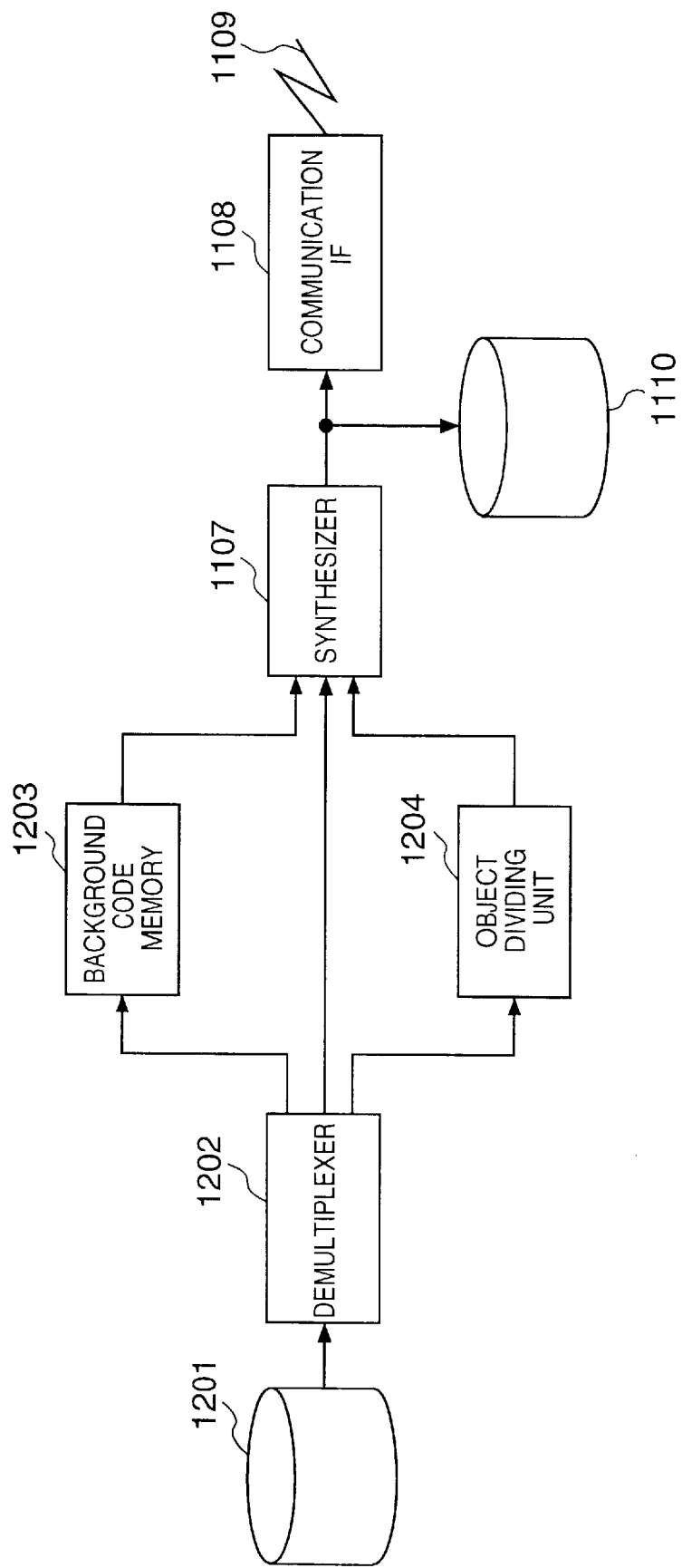
FIG. 40 is a block diagram showing the arrangement of an image processing apparatus in the fifth embodiment according to the present invention.

FIG. 40 is a block diagram showing the arrangement of a motion image processing apparatus according to the fifth embodiment. The same reference numerals as in the fourth embodiment denote the same parts in FIG. 40, and a detailed description thereof will be omitted. In the fifth embodiment, input data is encoded data obtained by the MPEG-4 coding system. However, the coding system in the fifth embodiment is not limited to this coding system.

Referring to FIG. 40, a storage device 1201 stores image data encoded by the MPEG-4 coding system. A demultiplexer 1202 demultiplexes input MPEG-4 encoded data into encoded data pertaining to a background image and encoded data pertaining to objects. A background code memory 1203 stores the separated encoded data pertaining to the background image. An object dividing unit 1204 is the characteristic feature of the fifth embodiment. Details of this object dividing unit 1204 will be described later.

Figure 41:
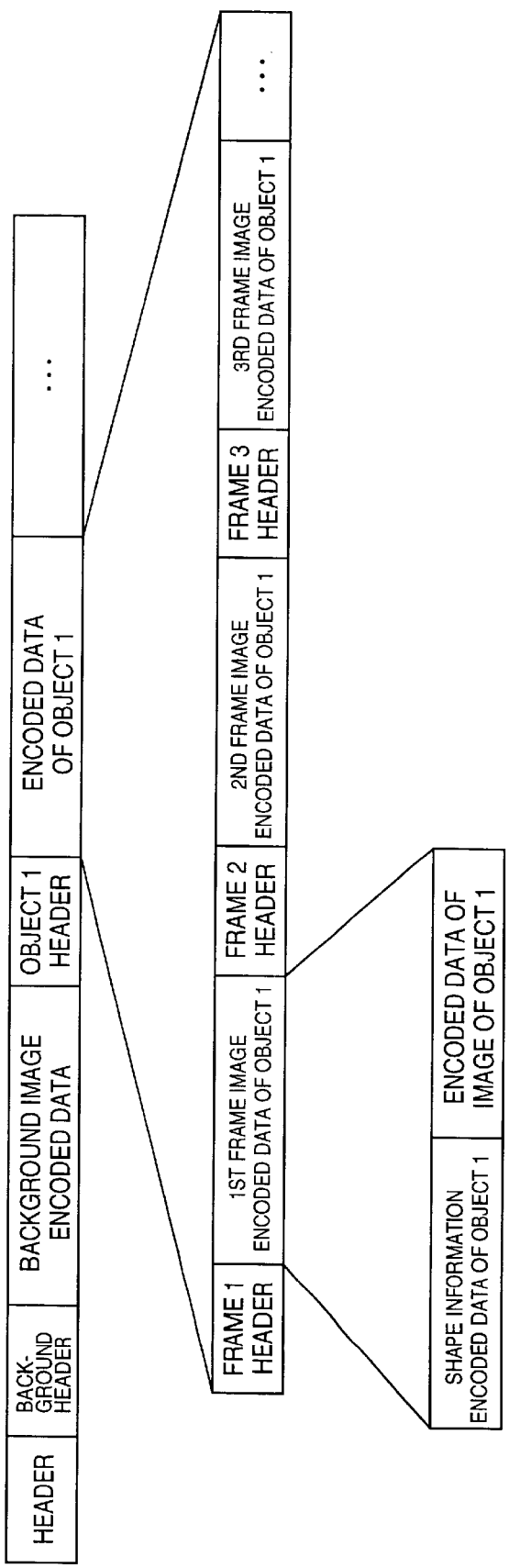
FIG. 41 is a view for explaining the format of encoded data in the fifth embodiment.

In the arrangement shown in FIG. 40, data encoded by the MPEG-4 coding system is read out from the storage device 1201 and input to the demultiplexer 1202. FIG. 41 shows the format of the input encoded data. Referring to FIG. 41, the encoded data has a header representing information of a whole image or code in the head position. Encoded data pertaining to a background image follows the header. This encoded data contains a background header including information such as the size of the background image and data of the background image which is encoded by an I-frame mode. The same number of encoded data of objects as the number of the objects follow the encoded data of the background image. The encoded data of each object has an object header containing information such as the size of the object, and object data encoded by the MPEG-4 coding system follows. This encoded data of each object contains a series of encoded data of frames. The encoded data of each frame has a frame header containing the mode and sync code of the frame and a main body of the encoded data. Note that this encoded data contains encoded data of shape information representing the shape of an object and encoded data of image data.

The demultiplexer 1202 analyzes the header of the encoded data shown in FIG. 41 and separately inputs the header to a multiplexer 1107, the encoded data of the background image to the background code memory 1203, and the encoded data of each object to the object dividing unit 1204. The background code memory 1203 stores the encoded data of the background image.

Figure 42:
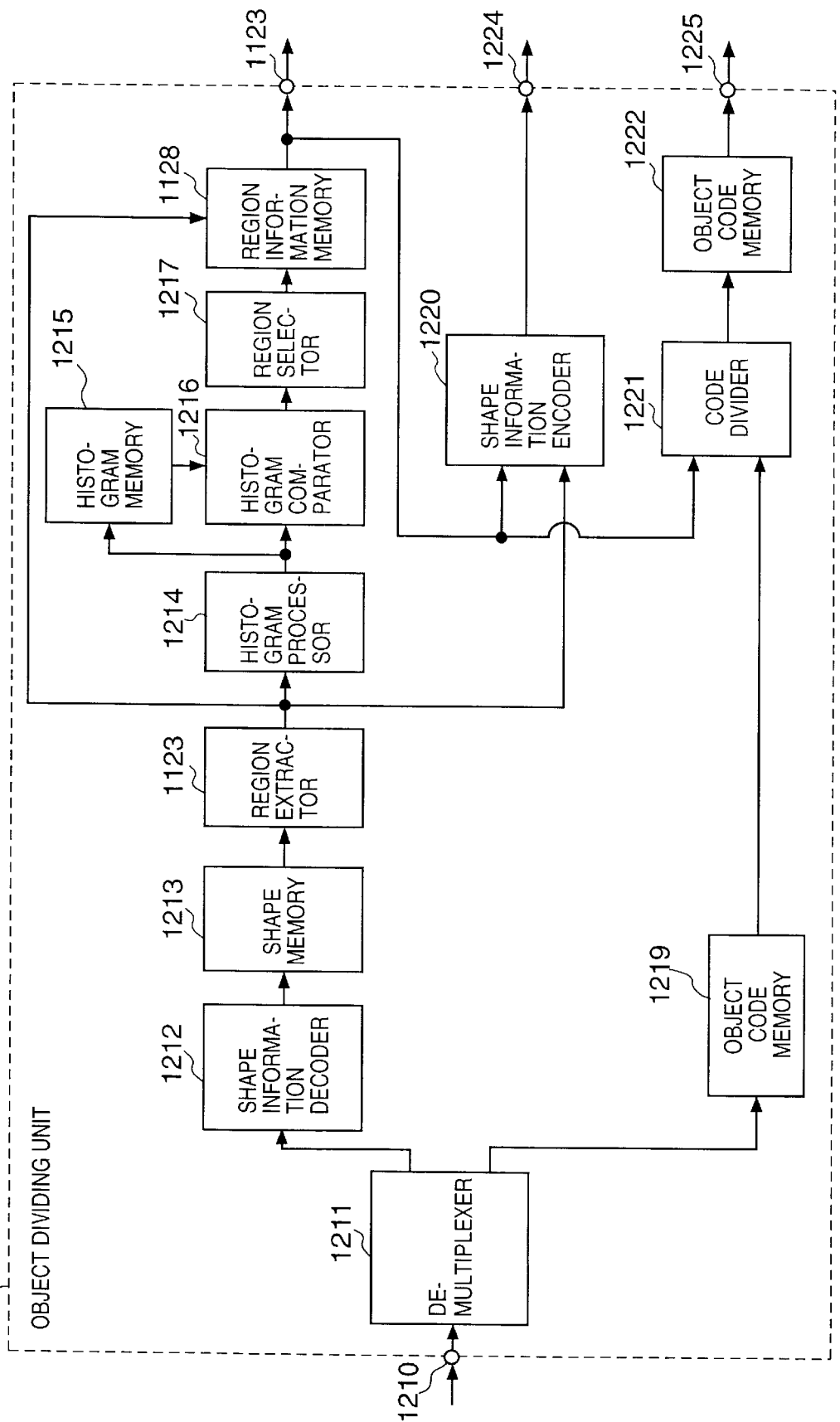
FIG. 42 is a block diagram showing details of the arrangement of an object dividing unit in the fifth embodiment.

FIG. 42 is a detailed block diagram showing the arrangement of the object dividing unit 1204. The same reference numerals as in FIG. 31 denote parts having the same functions in FIG. 42, and a detailed description thereof will be omitted.

Referring to FIG. 42, a terminal 1210 inputs the encoded data of each object from the demultiplexer 1202. A separator 1211 separates the input encoded data into the encoded data of shape information and the encoded data of image data. A shape information decoder 1212 decodes the shape information by the MPEG-4 coding system. A shape memory 1213 stores a binary image as the decoded shape information. A histogram processor 1214 generates histograms in units of output regions from a region extractor 1123. A histogram memory 1215 stores the generated histograms in units of regions. A histogram comparator 1216 obtains the similarity of each output region from the region extractor 1123 on the basis of the data of the region and the output from the histogram processor 1214. A region selector 1217 selects the most similar region on the basis of the result of comparison of the histograms. A terminal 1223 outputs the information of the extracted region.

A shape information encoder 1220 encodes each output region from the region extractor 1123 as new shape information in accordance with region information in a region information memory 1128. A terminal 1224 outputs the encoded data of the shape information of each region obtained by the shape information encoder 1220. An object code memory 1219 stores the encoded data of each object separated by the separator 1211. A code divider 1221 divides the encoded data in the object code memory 1219 into encoded data of individual objects in accordance with the region information in the region information memory 1128. An object code memory 1222 stores the divided encoded data. A terminal 1225 outputs the encoded data of an image of each object stored in the object code memory 1222.

In the object dividing unit 1204 with the above arrangement, the terminal 1210 first inputs encoded data of a first frame containing objects. This encoded data of the first frame is obtained by intraframe encoding, and no motion compensation is performed for the data. The separator 1211 separates the input encoded data into encoded data of shape information and encoded data of image data and inputs the shape information encoded data to the shape information decoder 1212 and the encoded image data to the object code memory 1219. The shape information decoder 1212 decodes the encoded data to reconstruct a binary image and stores the image in the shape memory 1213. The region extractor 1123 extracts closed regions as in the fourth embodiment and inputs shape information of each extracted region to the histogram processor 1214.

Figure 44B:
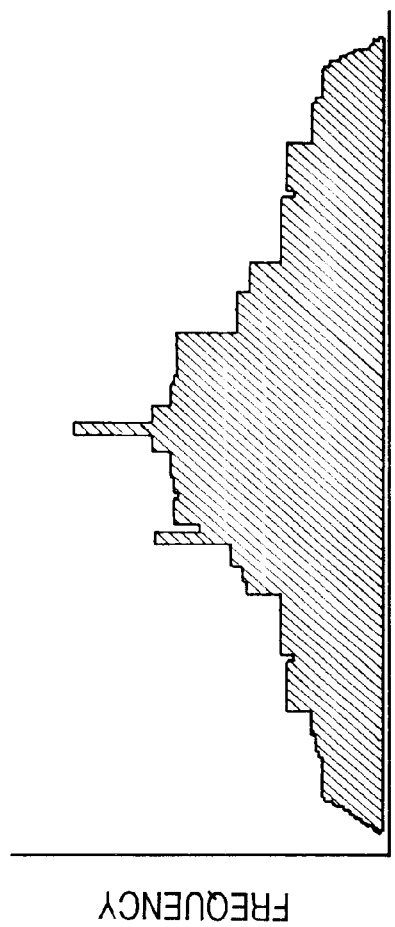
FIGS. 44A and 44B are views for explaining histograms in the fifth embodiment.
Figure 44A:
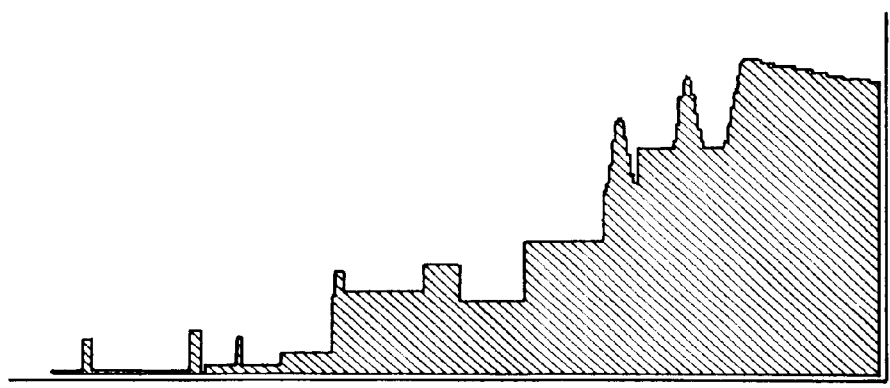
Figure 47:
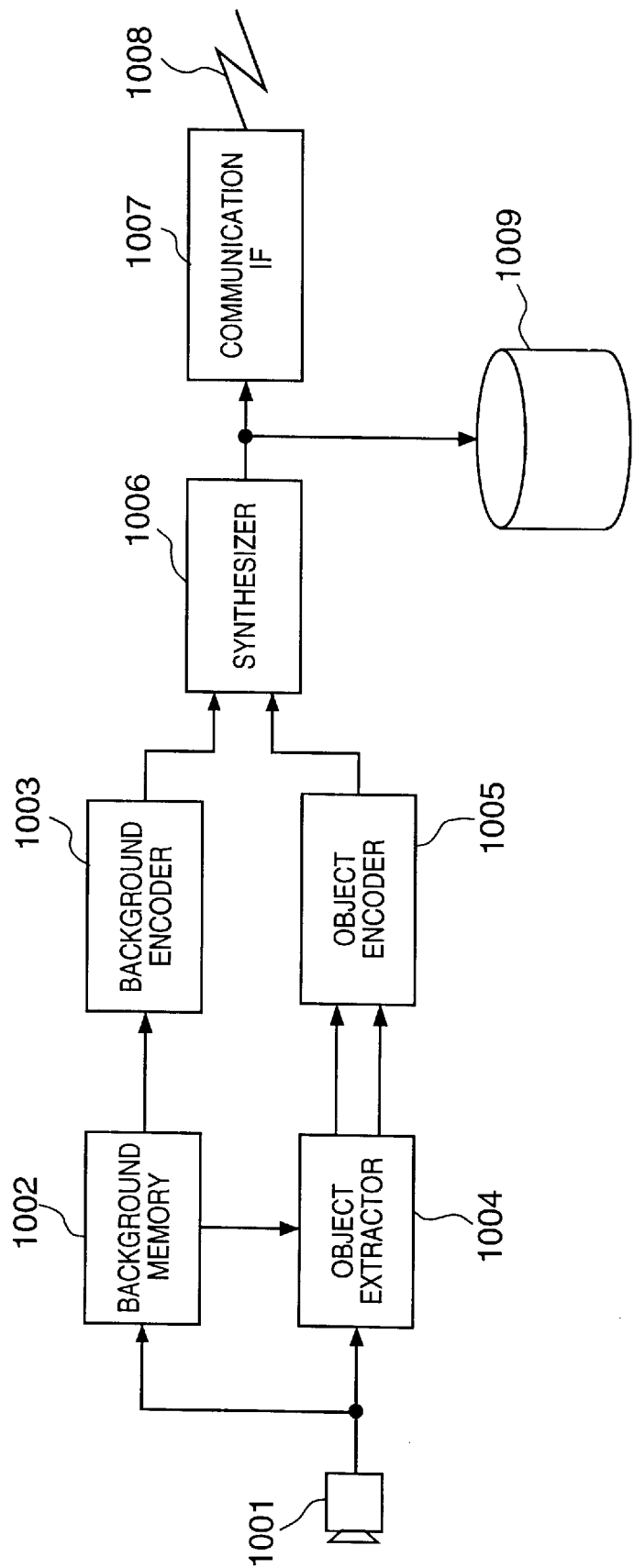
FIG. 47 is a block diagram showing a conventional motion image input apparatus.

The histogram processor 1214 first generates a histogram by counting pixel values in a main scan direction by regarding pixels inside a closed region as black(1) and pixels outside the region as white(0). The histogram processor 1214 then generates a histogram by counting pixels in a sub-scan direction. Assume that this histogram processing is performed for an image shown in FIG. 48. FIGS. 43A and 43B are graphs showing the results of histogram processing for a yacht as a left closed region. FIG. 43A shows a histogram in the main scan direction, and FIG. 43B shows a histogram in the sub-scan direction. The histogram memory 1215 stores data of these histograms in units of regions. Analogously, a histogram in the main scan direction shown in FIG. 44A and a histogram in the sub-scan direction shown in FIG. 44B are obtained by performing the histogram processing for a battle ship as a right closed region.

The histogram memory 1215 stores data of these histograms in units of regions. Note that the histogram comparator 1216 does not operate for the first frame.

The region selector 1217 selects the two extracted regions as new objects. The region information memory 1128 stores information such as the position and size of new shape information of each extracted region.

After that, the shape information is read out from the shape memory 1213, divided into individual objects by the region extractor 1123, and input to the shape information encoder 1220. The shape information encoder 1220 encodes the shape information of each object in accordance with shape information encoding of the MPEG-4 coding system. Additionally, the encoded data of the image data is read out from the object code memory 1219. The code divider 1221 checks a specific closed region to which the readout encoded data belongs, in accordance with the information in the region information memory 1128 and the shape information of the new object indicated by the region extractor 1123, and divides the encoded data in units of closed regions.

The input encoded data is encoded in units of macro blocks. FIG. 45 shows an image obtained by extracting an object from the image shown in FIG. 48 and dividing an image containing this object into macro blocks. FIG. 45 shows that the extracted object contains a yacht region 1250 and a battle ship region 1251 as objects to be divided. One square in the plot shown in FIG. 45 indicates one macro block. In the fifth embodiment, encoded data is read out in units of these macro blocks.

If a macro block does not contain the objects to be divided indicated by the regions 1250 and 1251, the encoded data is discarded. If a macro block is completely contained in an object, the encoded data is directly used. A not_coded code representing whether a macro block is encoded is added to each of macro blocks in portions where the two regions overlap. That is, in the region 1250, 56 macro blocks overlapping the region 1251 are outside the object (yacht). So, 56 not_coded codes are added to these macro blocks in the region 1250.

Code replacement may be performed for macro blocks (blocks 1252, 1253, and 1254 in FIG. 45) adjacent to the other region. This code replacement occurs when a macro block in one region is immediately before or above a macro block in another region. That is, macro blocks like this are predicted from the surrounding macro blocks, so these macro blocks cannot be decoded in some instances if the contents of macro blocks to be referred to change. Therefore, encoded data of a macro block encoded by referring to the surrounding macro blocks is once decoded and again encoded by substituting the value of the region information memory 1128 into macro blocks which are the surrounding macro clocks and blocks in another region. In this manner, the encoded data is divided into individual objects and stored in the object code memory 1222.

The foregoing is the dividing process for one frame by the object dividing unit 1204. Data is sequentially input to the object dividing unit 1204 in the order of succeeding frames. Assuming the succeeding frame has an image shown in FIG. 53, processing for the second and subsequent frames by the object dividing unit 1204 will be described below.

As in the case of the first frame, the separator 1211 separates input encoded data into encoded data of shape information and encoded data of image data. The shape information decoder 1212 decodes the encoded data and stores the decoded data in the shape memory 1213. The region extractor 1123 extracts closed regions and inputs shape information of each region to the histogram processor 1214 where histograms are generated for each region. FIGS. 46A and 46B are graphs showing the results of histogram processing performed for a yacht as a left closed region in FIG. 53. FIG. 46A is a histogram in the main scan direction, and FIG. 46B is a histogram in the sub-scan direction. The histogram comparator 1216 compares data of these histograms with the histograms of each region stored in the histogram memory 1215, thereby calculating the similarity. The method of comparison is not particularly limited. For example, the positional correlation between maximum values or the frequency distribution can be used.

The region selector 1217 selects a region having the highest similarity as an object, adds information such as the position and size to the information of the same object in the preceding frame, and stores the information in the region information memory 1128. Similar processing is performed for a battle ship as a right closed region in FIG. 53. After that, the histogram memory 1215 stores data of these histograms in units of regions.

The shape information is then read out from the shape memory 1213, divided into objects by the region extractor 1123, and encoded by the shape information encoder 1220.

Additionally, the encoded data of the image data is read out from the object code memory 1219. In accordance with the information in the region information memory 1128 and the shape information of the new object indicated by the region extractor 1123, the code divider 1221 checks a specific closed region to which the encoded data belongs and divides the encoded data in units of closed regions.

Note that motion compensation is sometimes performed for the second and subsequent frames. As described previously, codes of macro blocks which are not subjected to motion compensation are divided in units of macro blocks. On the other hand, a motion-compensated macro block cannot be decoded in some cases if the contents of macro blocks outside the region change when the motion vector of the motion-compensated macro block refers to these macro blocks. Therefore, only the motion vector is decoded and, only when this motion vector refers to a portion overlapping another region inside or outside the region of the motion-compensated macro block, the macro block is once decoded. After that, the decoded macro block is subjected to intraframe encoding. Alternatively, after an immediately preceding macro block is once decoded, motion compensation is performed by referring to this decoded macro block, and the motion-compensated macro block is encoded. By the above processing, codes are divided in units of macro blocks and further divided in units of objects. The object code memory 1222 stores these codes.

Finally, the multiplexer 1107 shown in FIG. 40 synthesizes outputs from the background code memory 1203 and the object dividing unit 1204 and adjusts the synthetic data into the form of MPEG-4 encoded data by adding a header and the like. The multiplexer 1107 transmits the encoded data to the communication channel 1109 via the communication interface 1108 or stores the data in the storage device 1110.

In the fifth embodiment as described above, objects can be divided without decoding entire encoded data. This allows high-speed division of objects. Additionally, the memory capacity can be reduced because no decoded images need to be stored.

Furthermore, since objects are subdivided by using a feature amount extracted from shape information, past shape information is held as numerical values, not as images.

Consequently, the memory capacity for storing past shape information can be reduced. That is, past shape information need not be image information.

In the fifth embodiment, the storage devices 1110 and 1201 are separated devices. However, it is also possible to construct these storage devices by a single device and write data in different memory areas.

Also, the similarity is calculated from histograms in the fifth embodiment, but the present invention is not limited to this embodiment. For example, a means similar to that in the fourth embodiment can be used. Alternatively, it is well possible to use generally known OCR technologies to select a region having the highest similarity to a stored shape.

The configuration and the like of memories in the fifth embodiment are not particularly limited. Also, each function can be partially or entirely realized by software using a CPU or the like.

The coding system is not restricted to MPEG-4, either. For example, shape information can be encoded by the JBIG coding system or the MMR coding system as a binary image coding system. It is of course also possible to compress object image data in units of frames or encode the data by e.g., MPEG-1, MPEG-2, or h.261.

Other Embodiments

The present invention can be applied to a system constituted by a plurality of devices (e.g., a host computer, interface, reader, and printer) or to an apparatus (e.g., a copying machine or facsimile) comprising a single device.

Further, the object of the present invention can also be achieved by providing a storage medium storing program codes of software for performing the aforesaid functions according to the embodiments to a system or an apparatus, reading the program codes with a computer (or a CPU or MPU) of the system or apparatus from the storage medium, and then executing the program.

In this case, the program codes read from the storage medium realize the functions according to the embodiments, and the storage medium storing the program codes constitutes the invention.

Further, as the storage medium for providing the program codes, it is possible to use, e.g., a floppy disk, hard disk, optical disk, magnetooptical disk, CD-ROM, CD-R, magnetic tape, nonvolatile type memory card, and ROM.

Furthermore, besides aforesaid functions according to the above embodiments are realized by executing the program codes which are read by a computer, the present invention includes a case where an OS (Operating System) or the like working on the computer performs a part or the whole of actual processing in accordance with designations by the program codes and realizes functions according to the above embodiments.

Furthermore, the present invention also includes a case where, after the program codes read from the storage medium are written in a function extension board which is inserted into the computer or in a memory provided in a function extension unit which is connected to the computer, a CPU or the like contained in the function extension board or unit performs a part or the whole of actual processing in accordance with designations of the program codes and realizes functions of the above embodiments.

When the present invention is applied to the above storage medium, this storage medium stores program codes corresponding to the aforementioned flow charts (FIGS. 2 and 6) and the like.

As many apparently widely different embodiments of the present invention can be made without departing from the spirit and scope thereof, it is to be understood that the invention is not limited to the specific embodiments thereof except as defined in the appended claims.

What is claimed is:

1. An image processing apparatus comprising:
    object extracting means for extracting at least one main object from an image;
    secondary object generating means for generating a secondary object to be attached to the main object;
    main object processing means for performing image processing for the main object; and
    secondary object processing means for performing image processing for the secondary object,
    wherein said apparatus further comprises main object encoding means for encoding the main object; and
    said secondary object generating means generates the secondary object on the basis of shape information of the encoded main object.

2. The apparatus according to claim 1, wherein said main object encoding means performs encoding by an MPEG-4 coding system.

3. An image processing system comprising:
    an object encoding apparatus for extracting an object from an image and encoding the extracted object;
    a background image encoding apparatus for receiving and encoding a background image; and
    an image synthesizing apparatus for receiving, decoding, and synthesizing the object encoded by said object encoding apparatus and the background image encoded by said background encoding apparatus,
    wherein said object encoding apparatus comprises:
        extracting means for extracting at least one object from an image; and
        main object encoding means for encoding a main object of the extracted object, and
    said image synthesizing apparatus comprises:
        secondary object generating means for generating a secondary object to be attached to the encoded main object on the basis of the encoded main object; and
        image synthesizing means for synthesizing the main object and the secondary object with the background image,
        wherein said secondary object generating means generates the secondary object on the basis of shape information of the encoded main object.

4. An image processing system comprising:
    an object encoding apparatus for extracting an object from an image and encoding the extracted object;
    a background image encoding apparatus for receiving and encoding a background image; and
    an image synthesizing apparatus for receiving, decoding, and synthesizing the object encoded by said object encoding apparatus and the background image encoded by said background encoding apparatus,
    wherein said object encoding apparatus comprises:
        extracting means for extracting at least one object from an image; and
        main object encoding means for encoding a main object of the extracted object, and
    said image synthesizing apparatus comprises:
        secondary object generating means for generating a secondary object to be attached to the encoded main object on the basis of the encoded main object; and image synthesizing means for synthesizing the main object and the secondary object with the background image, wherein said image synthesizing apparatus further comprises edit designating means for designating editing of the main object and the secondary object and performs image synthesis after editing the main object and the secondary object in accordance with the edit designation.

5. The system according to claim 4, wherein said edit designating means designates a shape and/or intensity by which the main object and the secondary object are synthesized.

6. An image processing method comprising:

an extracting step of extracting at least one main object from an image;

a secondary object generation step of generating a secondary object to be attached to the main object;

a main object pro step of performing image processing for the main object; and a secondary object processing step of performing image processing for the secondary object, wherein said method further comprises a main object encoding step of encoding the main object; and said secondary object generation step generates the secondary object on the basis of shape information of the encoded main object.

7. An image processing method comprising:

an object encoding step of extracting an object from an image and encoding the extracted object;

a background encoding step of receiving and encoding a background image; and an image synthesizing step of receiving, decoding and synthesizing the object encoded in said object encoding step and the background image encoded in said background encoding step, wherein said object encoding step comprises:

an extracting step of extracting at least one object from an image; and a main object encoding step of encoding a main object of the extracted object, and said image synthesizing step comprises:

a secondary object generating step of generating a secondary object to be attached to the encoded main object on the basis of the encoded main object; and an image synthesizing step of synthesizing the main object and the secondary object with the background image, wherein said secondary object generating step generates the secondary object on the basis of shape information of the encoded main object.

8. An image processing method comprising:

an object encoding step of extracting an object from an image and encoding the extracted object;

a background encoding step of receiving and encoding a background image; and an image synthesizing step of receiving, decoding, and synthesizing the object encoded in said object encoding step and the background image encoded in said background encoding step, wherein said object encoding step comprises:

an extracting step of extracting at least one object from an image; and a main object encoding step of encoding a main object of the extracted object, and said image synthesizing step comprises:

a secondary object generating step of generating a secondary object to be attached to the encoded main object on the basis of the encoded main object;

an image synthesizing step of synthesizing the main object and the secondary object with the background image; and an edit designating step of designating editing of the main object and the secondary object, wherein image synthesis is performed after editing the main object and the secondary object in accordance with the edit designation.

* * * * *

UNITED STATES PATENT AND TRADEMARK OFFICE
CERTIFICATE OF CORRECTION

PATENT NO. : 6,625,316 B1
DATED : September 23, 2003
INVENTOR(S) : Maeda

It is certified that error appears in the above-identified patent and that said Letters Patent is hereby corrected as shown below:

Column 3,
Line 16, "at a" should read -- at an --.

Column 7,
Line 58, "memory 10S" should read -- memory 105 --.

Column 9,
Line 41, "synthesis. Display" should read -- synthesis display --; and
Line 49, "over writes" should read -- overwrites --.

Column 10,
Line 12, "synthesis-" should read -- synthesis --;
Line 13, ".display" should read -- display --; and
Line 15, "synthesis.display" should read -- synthesis display --.

Column 24,
Line 18, "aright" should read -- a right --.

Column 27,
Line 19, "pro" should read -- processing --.

Signed and Sealed this

Sixth Day of July, 2004

JON W. DUDAS
*Acting Director of the United States Patent and Trademark Office*